(12) United States Patent
Fleming

(10) Patent No.: US 7,215,473 B2
(45) Date of Patent: May 8, 2007

(54) ENHANCED HEAT MIRROR FILMS

(75) Inventor: Robert James Fleming, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 498 days.

(21) Appl. No.: 10/222,473

(22) Filed: Aug. 17, 2002

(65) Prior Publication Data

US 2004/0032658 A1   Feb. 19, 2004

(51) Int. Cl.
*G02B 5/28* (2006.01)
*G02B 27/28* (2006.01)

(52) U.S. Cl. ............... 359/585; 359/584; 359/494; 359/498

(58) Field of Classification Search ........... 359/494, 359/584, 585, 497, 498; 428/483, 457
See application file for complete search history.

(56) References Cited

U.S. PATENT DOCUMENTS

| | | | |
|---|---|---|---|
| 3,302,002 A | 1/1967 | Warren | |
| 3,311,517 A | 3/1967 | Keslar et al. | |
| 3,529,074 A | 9/1970 | Lewis | |
| 3,601,471 A | 8/1971 | Seddon et al. | |
| 3,682,528 A | 8/1972 | Apfel et al. | |
| 3,752,348 A | 8/1973 | Dickason et al. | |
| 3,897,140 A | 7/1975 | Tuthill | |
| 3,990,784 A | 11/1976 | Gelber | |
| 4,017,661 A | 4/1977 | Gillery | |
| 4,166,876 A | 9/1979 | Chiba et al. | |
| 4,226,910 A | 10/1980 | Dahlen et al. | |
| 4,234,654 A | 11/1980 | Yatabe et al. | |
| 4,320,169 A | 3/1982 | Yatabe et al. | |
| 4,413,877 A | 11/1983 | Suzuki et al. | |
| 4,537,814 A | 8/1985 | Itoh et al. | |
| 4,590,118 A | 5/1986 | Yatabe et al. | |
| 4,639,069 A | 1/1987 | Yatabe et al. | |
| 4,645,714 A | 2/1987 | Roche et al. | |
| 4,696,719 A | 9/1987 | Bischoff | |
| 4,722,515 A | 2/1988 | Ham | |

(Continued)

FOREIGN PATENT DOCUMENTS

DE          32 41 516          5/1984

(Continued)

OTHER PUBLICATIONS

U.S. Appl. No. 10/222,449, filed Aug. 17, 2002, Flexible Electrically Conductive Film.

(Continued)

*Primary Examiner*—Audrey Chang
(74) *Attorney, Agent, or Firm*—Melanie G. Gover; Lisa P. Fulton

(57) ABSTRACT

A heat mirror film containing visible light-transmissive and infrared reflective film comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer has improved infrared reflecting properties. The film can be joined or laminated into glazing (especially non-planar vehicular safety glazing) with reduced likelihood that the metal or metal alloy layer will be damaged or distorted.

46 Claims, 9 Drawing Sheets

U.S. PATENT DOCUMENTS

| | | | |
|---|---|---|---|
| 4,782,216 A | 11/1988 | Woodard | |
| 4,786,783 A | 11/1988 | Woodard | |
| 4,799,745 A | 1/1989 | Meyer et al. | |
| 4,842,893 A | 6/1989 | Yializis et al. | |
| 4,855,186 A | 8/1989 | Grolig et al. | |
| 4,910,090 A | 3/1990 | Kuhlman et al. | |
| 4,954,371 A | 9/1990 | Yializis | |
| 4,965,408 A | 10/1990 | Chapman et al. | |
| 4,973,511 A | 11/1990 | Farmer et al. | |
| 5,011,585 A | 4/1991 | Brochot et al. | |
| 5,018,048 A | 5/1991 | Shaw et al. | |
| 5,032,461 A | 7/1991 | Shaw et al. | |
| 5,071,206 A | 12/1991 | Hood et al. | |
| 5,085,141 A | 2/1992 | Triffaux | |
| 5,091,244 A | 2/1992 | Biornard | |
| 5,097,800 A | 3/1992 | Shaw et al. | |
| 5,125,138 A | 6/1992 | Shaw et al. | |
| 5,260,095 A | 11/1993 | Affinito | |
| RE34,605 E | 5/1994 | Schrenk et al. | |
| 5,324,374 A | 6/1994 | Harmand et al. | |
| 5,332,888 A | 7/1994 | Tausch et al. | |
| 5,356,947 A | 10/1994 | Ali et al. | |
| 5,360,659 A | 11/1994 | Arends et al. | |
| 5,395,644 A | 3/1995 | Affinito | |
| 5,440,446 A | 8/1995 | Shaw et al. | |
| 5,489,489 A | 2/1996 | Swirbel et al. | |
| 5,547,508 A | 8/1996 | Affinito | |
| 5,681,615 A | 10/1997 | Affinito et al. | |
| 5,681,666 A | 10/1997 | Treger et al. | |
| 5,686,360 A | 11/1997 | Harvey, III et al. | |
| 5,699,188 A * | 12/1997 | Gilbert et al. | 359/584 |
| 5,725,909 A | 3/1998 | Shaw et al. | |
| 5,744,227 A | 4/1998 | Bright et al. | |
| 5,757,126 A | 5/1998 | Harvey, III et al. | |
| 5,771,562 A | 6/1998 | Harvey, III et al. | |
| 5,773,102 A | 6/1998 | Rehfeld | |
| 5,783,049 A | 7/1998 | Bright et al. | |
| 5,877,895 A | 3/1999 | Shaw et al. | |
| 5,882,774 A | 3/1999 | Jonza et al. | |
| 5,981,059 A | 11/1999 | Bright et al. | |
| 6,007,901 A | 12/1999 | Maschwitz et al. | |
| 6,030,671 A | 2/2000 | Yang et al. | |
| 6,045,864 A | 4/2000 | Lyons et al. | |
| 6,049,419 A | 4/2000 | Wheatley et al. | |
| 6,083,628 A | 7/2000 | Yializis | |
| 6,111,698 A | 8/2000 | Woodard et al. | |
| 6,146,225 A | 11/2000 | Sheats et al. | |
| 6,157,490 A | 12/2000 | Wheatley et al. | |
| 6,204,480 B1 | 3/2001 | Woodard et al. | |
| 6,207,260 B1 | 3/2001 | Wheatley et al. | |
| 6,214,422 B1 | 4/2001 | Yializis | |
| 6,231,939 B1 | 5/2001 | Shaw et al. | |
| 6,243,201 B1 | 6/2001 | Fleming et al. | |
| 6,255,003 B1 | 7/2001 | Woodard et al. | |
| 6,268,695 B1 | 7/2001 | Affinito | |
| 6,268,961 B1 | 7/2001 | Nevitt et al. | |
| 6,413,645 B1 | 7/2002 | Graff et al. | |
| 6,492,026 B1 | 12/2002 | Graff et al. | |
| 6,522,067 B1 | 2/2003 | Graff et al. | |
| 6,573,652 B1 | 6/2003 | Graff et al. | |
| 6,706,412 B2 * | 3/2004 | Yializis | 428/463 |
| 2001/0010846 A1 | 8/2001 | Hofmeister et al. | |
| 2002/0039235 A1 | 4/2002 | Condo et al. | |

FOREIGN PATENT DOCUMENTS

| | | |
|---|---|---|
| EP | 0 722 787 A | 7/1996 |
| EP | 0 810 452 A2 | 12/1997 |
| EP | 0873839 A1 | 10/1998 |
| EP | 0944299 A2 | 9/1999 |
| EP | 0944299 A3 | 9/1999 |
| EP | 0977167 A1 | 2/2000 |
| WO | WO 92/12219 | 7/1992 |
| WO | WO 95/10117 | 4/1995 |
| WO | WO 97/01440 | 1/1997 |
| WO | WO 97/01778 | 1/1997 |
| WO | WO 97/04885 | 2/1997 |
| WO | WO 98/26927 | 6/1998 |
| WO | WO 99/36248 | 7/1999 |
| WO | WO 99/36262 | 7/1999 |
| WO | WO 00/26973 | 5/2000 |
| WO | WO 00/48749 | 8/2000 |
| WO | WO 01/31393 A1 | 5/2001 |
| WO | WO 01/58989 A1 | 8/2001 |
| WO | WO 01/96104 A2 | 12/2001 |
| WO | WO 01/96115 A1 | 12/2001 |
| WO | WO 01/96104 * | 8/2002 |

OTHER PUBLICATIONS

U.S. Appl. No. 10/222,466, filed Aug. 17, 2002, Polymer-Metal Infrared Interference Filter.

U.S. Appl. No. 10/222,465, filed Aug. 17, 2002, Durable Transparent EMI Shielding Film.

Article: Cairns et al., "Strain-Dependent Electrical Resistance of Tin-Doped Indium Oxide on Polymer Substrates," *Applied Physics Letters*, vol. 76, No. 11, Mar. 13, 2000, pp. 425-427.

Affinito, J.D., "*Vacuum deposited polymer/silver reflector material*", SPIE Press, vol. 2262, pp. 276-283, Jul. 25, 1994.

International Search Report for related PCT/US03/21887.

Presentation: Affinito et al., "Polymer-Oxide Transparent Barrier Layers," SVC 39th Annual Technical Conference, Paper No. W-12, (1996), pp. 1-6.

Presentation: Shaw et al., "A New Vapor Deposition Process for Coating Paper and Polymer Webs," Sixth Internationl Vacuum Web Coating Conference, Reno, NV, Oct. 28, 1992, pp. 18-24.

Presentation: Shaw et al., "A New High Speed Process for Vapor Depositing Acrylate Thin Films: An Update," Society of Vacuum Coaters 36th Annual Technical Conference (1993), pp. 348-352.

Presentation: Shaw et al., "Use of Vapor Deposited Acrylate Coatings to Improve the Barrier Properties of Metallized Film," Society of Vacuum Coaters 37th Annual Technical Conference (1994), pp. 240-247.

Presentation: Shaw et al., "Use of Evaporated Acrylate Coatings to Smooth the Surface of Polyester and Polypropylene Film Substrates," Rad Tech (1996), (12 pages).

Article: Affinito et al., "Vacuum Deposited Polymer/Metal Multilayer Films for Optical Application," *Thin Solid Films*, vol. 270, (1995), pp. 43-48.

Product Information: "Southwall™ Altair™ M Transparent Conductive Film," (date unknown but believed to be prior to filing date of present application), 1 page.

Product Information: "Shielded Windows," Advanced Performance Materials, (date unknown but believed to be prior to filing date of present application), 1 page.

Product Information: "EMI Shielding Products," Advanced Performance Materials, (date unknown but believed to be prior to filing date of present application), 2 pages.

Technological Information: "EMI Theory," Chomerics, (date unknown but believed to be prior to filing date of present application), pp. 1-3.

Technological Information: "Shielding Methods," Chomerics, (date unknown but believed to be prior to filing date of present application), pp. 1-7.

Product Information: "Display Products," Southwall Technologies, (date unknown but believed to be prior to filing date of present application), pp. 1-2.

Product Information: "BE 9 Shielded Windows," Advanced Performance Materials GMBH, (date unknown but believed to be prior to filing date of present application), pp. 60-67.

* cited by examiner

ENHANCED HEAT MIRROR FILMS

FIELD OF THE INVENTION

This invention relates to birefringent dielectric multilayer reflecting films and optical articles made therefrom.

BACKGROUND

Glazing materials sometimes include one or more functional layers engineered to enhance the performance of the glazing. One important functional layer reduces transmission of infrared radiation. Infrared-rejecting functional layers are typically made of partially transparent metallized or dyed polymer film constructions that reflect or absorb unwanted solar radiation. References describing such functional layers include U.S. Pat. Nos. 4,590,118, 4,639,069 and 4,799,745.

An especially useful infrared-rejecting functional layer can be formed from an infrared-rejecting Fabry-Perot quarter wave stack. In such a stack, a transparent dielectric spacing layer separates two or more partially reflective thin metal or metal alloy layers. The metal or metal alloy layers (which for brevity will sometimes be referred to herein as "metal layers") typically contain elemental or alloyed silver, copper or gold. The dielectric layer typically contains an inorganic oxide (applied from an organic solution or applied using sputter deposition) or an organic polymer (applied by dissolving the polymer in a solvent solution). The dielectric layer optical thickness (defined as the physical thickness of the dielectric layer times its in-plane index of refraction) preferably is about ¼ the wavelength of the center of the desired pass band. Light whose wavelength is within the pass band is mainly transmitted through the thin metal layers. Light whose wavelength is above the pass band is mainly reflected by the thin metal layers or suppressed due to destructive interference. References describing such infrared-rejecting Fabry-Perot quarter wave stacks include U.S. Pat. Nos. 4,590,118, 4,639,069 and 4,799,745.

Infrared-rejecting functional layers have also been made from birefringent non-metallic films containing alternating layers of dielectric materials. Birefringent dielectric multilayer films (which can also be referred to as a multilayer optical films or "MOF") can be engineered to reflect or absorb a desired amount of light in a spectral region of interest while transmitting sufficient visible light in the visible region of the spectrum to be substantially transparent. Multilayer optical films preferably include alternating layers of a first material having a first index of refraction and a second material having a second index of refraction that is different from the first index of refraction. Multilayer optical films can have a Brewster angle (the angle at which reflectance of p polarized light goes to zero) that is very large or nonexistent. The films can be made into a multilayer mirror whose reflectivity for p polarized light decreases slowly with angle of incidence, is independent of angle of incidence, or increases with angle of incidence away from the normal. Multilayer optical films can have high reflectivity (for both s and p polarized light) for any incident direction. References describing such multilayer optical films include U.S. Pat. Nos. 5,699,188, 5,882,774 and 6,049,419, and PCT Published Application No. 97/01778.

SUMMARY OF THE INVENTION

Attempts have been made to include functional layers containing transparent metallized film constructions in glazing, e.g., architectural and vehicular safety glazing. However, these attempts have met with only limited success. Fabrication of non-planar glazing is particularly difficult. We believe these difficulties may be due in part to the fragility of one or more of the stack layers, to the tendency of the metal layers to corrode, or to localized changes in the distance between the metal layers caused by the stretching, heating and cooling that take place during lamination, autoclaving and subsequent use of the glazing. We believe these difficulties may be aggravated when the functional layer is placed adjacent to an anti-lacerative mechanical energy-absorbing layer such as polyvinyl butyral ("PVB"). PVB sheets typically contain significant quantities of plasticizers and other adjuvants. We believe that these adjuvants can migrate into an infrared-rejecting functional layer and cause corrosion, swelling, localized changes in the distance between the metal layers of a Fabry-Perot stack or other effects that can lead to fabrication or performance problems.

We have found that by forming in either order a thin metal layer and a crosslinked polymeric layer atop a birefringent dielectric multilayer support, and optionally forming one or more additional thin metal layers or crosslinked polymeric layers thereon, we can obtain an improved functional film. We have also found that a further improvement can be obtained by modifying an interface between the thin metal layer or layers and adjacent layers within the film to enhance interlayer adhesion.

Accordingly, in one aspect, the present invention provides a process for making a film comprising:
 a) providing a visible light-transmissive birefringent dielectric multilayer support that reflects at least 50% of light in a band at least 100 nm wide in a wavelength region of interest, and
 b) forming in either order atop the support:
  i) a visible light-transmissive metal or metal alloy layer, and
  ii) a crosslinked polymeric layer, whereby the thickness of the metal or metal alloy layer is such that the film is visible light-transmissive and its reflection band is broadened.

In a second aspect, the invention provides a process for making a glazing article, comprising assembling a layer of glazing material and a film comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer, and bonding the glazing material and film together into a unitary article.

In a third aspect, the invention provides a process for making a laminate article comprising:
 a) assembling:
  i) a first layer of a glazing material,
  ii) a first mechanical energy-absorbing layer,
  iii) a visible light-transmissive and infrared-reflective film layer comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer,
  iv) a second mechanical energy-absorbing layer and
  v) a second layer of glazing material,
 b) removing residual air from between the layers, and c) heating and applying pressure to bond the layers together into a unitary article.

In a fourth aspect, the invention provides a film comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer.

In a fifth aspect, the invention provides a glazing article comprising at least one layer of a glazing material joined to a visible light-transmissive and infrared-reflective film comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer.

In a sixth aspect, the invention provides a safety glazing pre-laminate comprising at least one layer of a mechanical energy-absorbing material joined to a visible light-transmissive and infrared-reflective film comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer.

In a seventh aspect, the invention provides a vehicle with glazing comprising at least one windshield, backlight, side window or skylight comprising a visible light-transmissive and infrared reflective film comprising a birefringent dielectric multilayer support that reflects at least 50% of light in a band at least 100 nm wide in a wavelength region of interest, a metal or metal alloy layer whose thickness is such that the film is visible light-transmissive and its reflection band is broadened, and a crosslinked polymeric layer.

BRIEF DESCRIPTION OF THE DRAWINGS

Like reference symbols in the various figures of the drawing indicate like elements. The elements in the drawing are not to scale.

DETAILED DESCRIPTION

Figure 1:
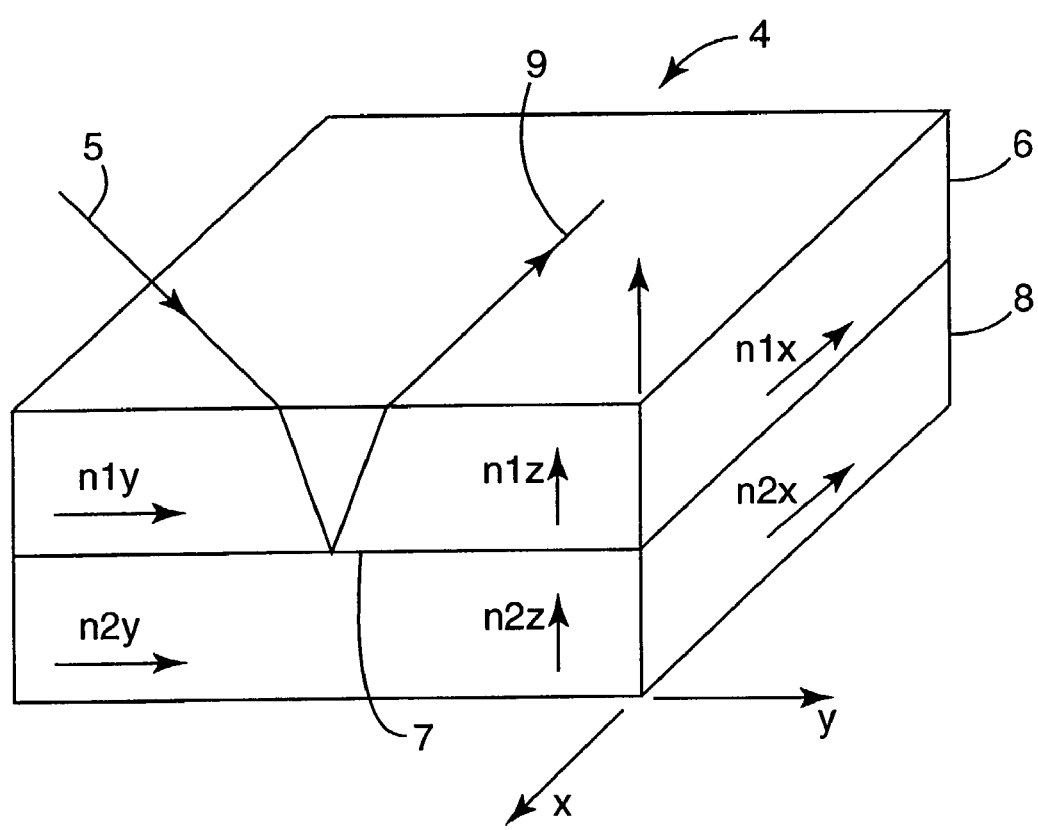
FIG. 1 is a schematic perspective view of a stack of two polymeric layers forming an interface.

By using words of orientation such as "atop", "on", "uppermost" and the like for the location of various layers in the films or articles of the invention, we refer to the relative position of one or more layers with respect to a horizontal support layer. We do not intend that the films or articles should have any particular orientation in space during or after their manufacture.

By a "crosslinked" polymer, we mean a polymer in which polymer chains are joined together by covalent chemical bonds, usually via crosslinking molecules or groups, to form a network polymer. A crosslinked polymer is generally characterized by insolubility, but may be swellable in the presence of an appropriate solvent. The term "polymer" includes homopolymers and copolymers, as well as homopolymers or copolymers that may be formed in a miscible blend, e.g., by coextrusion or by reaction, including, e.g., transesterification. The terms "copolymer" and "copolyester" include both random and block copolymers.

By an "extensible" metal or metal alloy layer we refer to a layer that when incorporated into a visible light-transmissive film can be stretched by at least 3% in an in-plane direction without loss of electrical continuity and without forming visible discontinuities in the surface of the metal or metal alloy layer as detected by the naked eye at a distance of about 0.25 meters.

By a "visible light-transmissive" support, layer, film or article, we mean that the support, layer, film or article has a transmission in the visible portion of the spectrum, $T_{vis}$, of at least about 20%, measured along the normal axis. By an "infrared-reflective" support, layer, film or article, we mean that the support, layer, film or article reflects at least about 50% of light in a band at least 100 nm wide in a wavelength region from about 700 nm to about 2000 nm, measured at a near-normal angle (e.g., at about a 6° angle of incidence). By "light" we mean solar radiation.

By a "reflection band" we mean a range of wavelengths of light that is substantially reflected by the film or article in question. A reflection band is "broadened" when the range of substantially reflected wavelengths of light spans a larger range of wavelengths.

By a "non-planar" surface or article (e.g., of glass or other glazing material), we mean that the surface or article has a continuous, intermittent, unidirectional or compound curvature. By a surface or article with "compound curvature", we mean that the surface or article curves in two different, non-collinear directions from a single point.

By "without substantial cracking or creasing" we refer to a film that has been laminated into an article, and in which there is a lack of visible discontinuities in the surface of the film or the visible metal or metal alloy layers as detected by the naked eye at a distance of about 1 meter, preferably about 0.5 meters. By "without substantial wrinkling" we refer to a film that has been laminated into an article, and in which there is a lack of small ridges or furrows resulting from contraction of the smooth film surface as detected using the naked eye at a distance of about 1 meter, preferably about 0.5 meters. By "optically clear" we refer to a laminated article in which there is an absence of visibly noticeable distortion, haze or flaws as detected by the naked eye at a distance of about 1 meter, preferably about 0.5 meters.

Referring to FIG. 1, two layers of an MOF support 4 are shown in perspective view. Typically, the support will have tens or hundreds or even thousands of such layers. Layer 6 has in-plane indices of refraction $n1x$ and $n1y$ in the x- and y-axis directions and index of refraction $n1z$ in the z-axis direction. Layer 8 has in-plane indices of refraction n2x and n2y in the x- and y-axis directions and index of refraction n2z in the z-axis direction. Incident light ray 7 is refracted as it passes through layer 6, reflected at interface 7, refracted as it passes once again through layer 6 and exits layer 6 as reflected ray 9. The reflectance characteristics of the multilayer support (when considered by itself) are determined by the in-plane indices of refraction for the layers within the support. In particular, reflectivity depends upon the relationship between the indices of refraction of each layer material in the x, y, and z directions. The MOF support preferably is formed using at least one uniaxially birefringent material, in which two indices (typically along the x and y axes, or nx and ny) are approximately equal, and different from the third index (typically along the z axis, or nz).

Figure 2A:
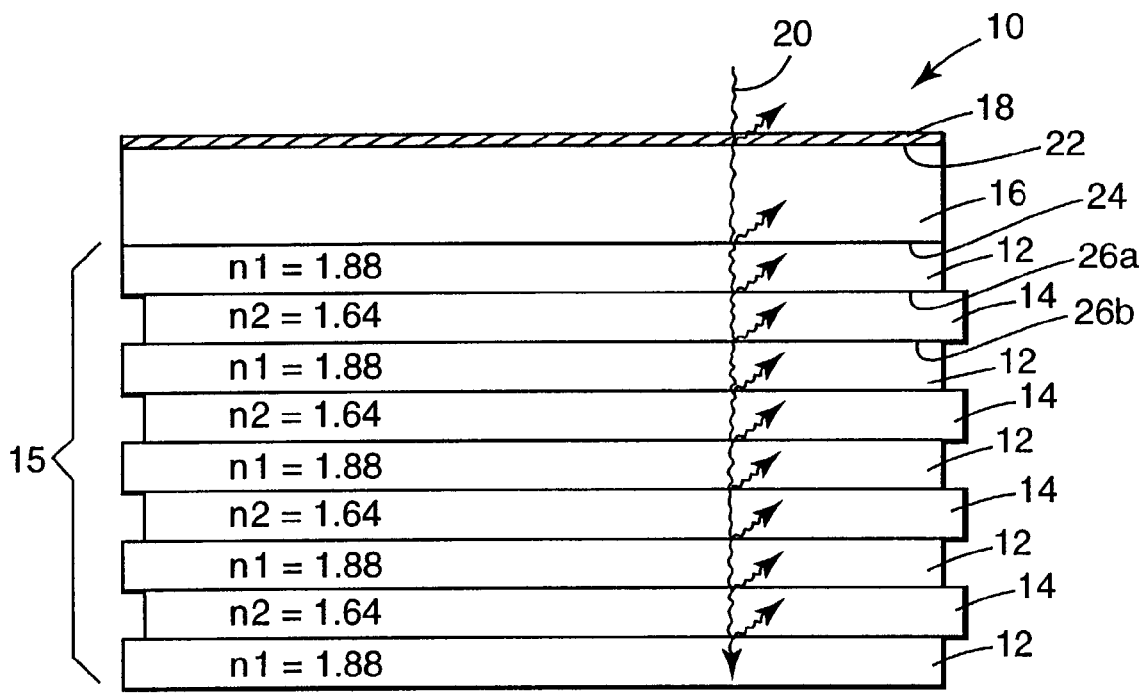
FIG. 2A, FIG. 2B, FIG. 2C, FIG. 2D and FIG. 2E are schematic cross-sectional views of films of the invention.

In FIG. 2A a film 10 of the invention is shown in cross-sectional schematic view. Layers 12 have been stretched and have a higher index of refraction n1 than index n2 of adjacent layers 14. Taken together, the stack of layers 12, 14 forms MOF support 15. Crosslinked polymeric layer 16 lies atop support 15. Metal or metal alloy layer 18 (which as noted above can be referred to simply as a "metal layer") lies atop layer 16. Incident light rays such as ray 20 are partially reflected at the first surface of metal layer 18, the interface 22 between layers 18 and 16, the interface 24 between layer 16 and the adjacent layer 12, and at interfaces such as 26a, 26b and the like between adjacent layers 12, 14. Layer 18 is sufficiently thin so that layer 18 and film 10 as a whole are visible light-transmissive. Layer 18 is sufficiently thick so that the reflection band of film 10 as a whole is broadened. Thus in such a film, metal layer 18 combines with the MOF support 15 to provide a film having a broadened reflection band (e.g., for infrared radiation) compared to a film containing only the metal layer or only the MOF support. Crosslinked polymeric layer 16 is in intimate contact with metal layer 18 and is believed to discourage cracking, wrinkling or separation of metal layer 18 when film 10 is stretched or otherwise subjected to strain. Use of a crosslinked polymeric layer in film 10 makes film 10 more readily orientable without damaging nearby metal layer(s) or altering the spacing of a stack of such metal layers.

Figure 2B:
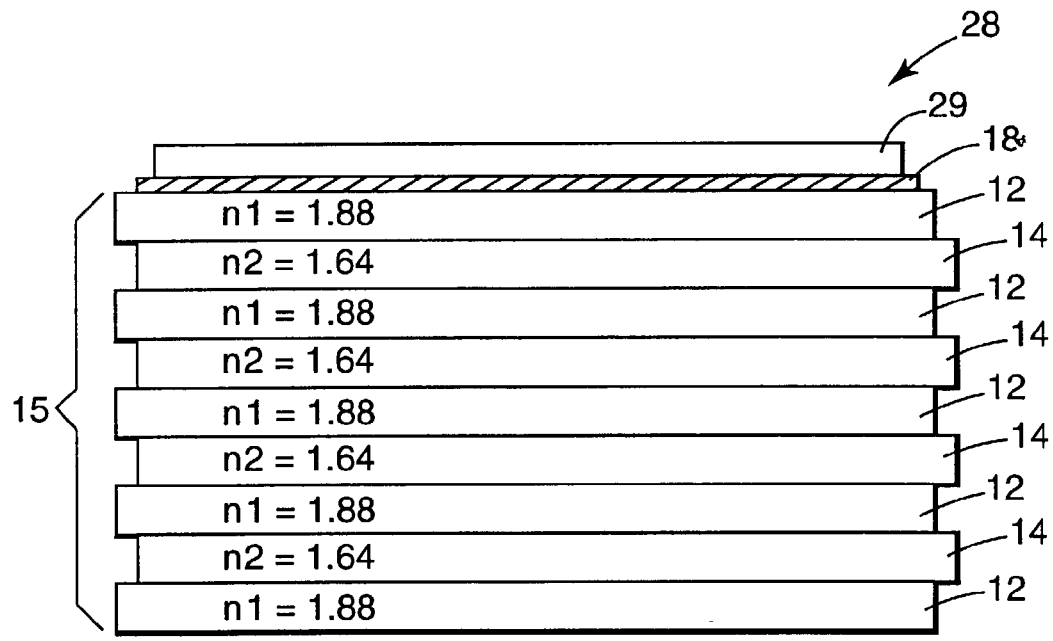

In FIG. 2B another film 28 of the invention is shown in cross-sectional schematic view. Film 28 resembles film 10 but metal layer 18 lies between support 15 and crosslinked polymeric layer 29. Layer 18 is sufficiently thin so that layer 18 and film 28 as a whole are visible light-transmissive. Layer 18 is sufficiently thick so that the reflection band of film 28 as a whole is broadened. Crosslinked polymeric layer 29 is in intimate contact with metal layer 18, and is believed to discourage cracking, wrinkling or separation of metal layer 18 when film 28 is stretched or otherwise subjected to strain. Layer 29 also functions as a protective layer over metal layer 18.

Figure 2C:
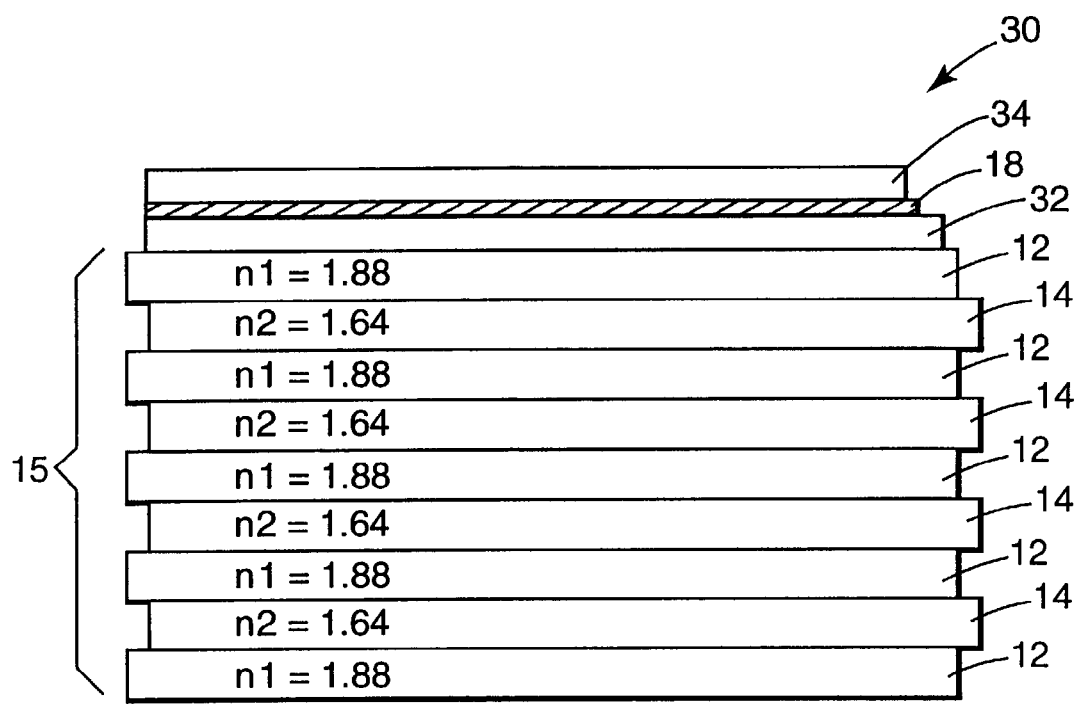

In FIG. 2C a third film 30 of the invention is shown in cross-sectional schematic view. Film 30 resembles films 10 and 28 but metal layer 18 has a crosslinked polymeric layer 32, 34 adjacent to each of its faces. Crosslinked polymeric layers 32, 34 both are in intimate contact with metal layer 18, and are especially effective at discouraging cracking, wrinkling or separation of metal layer 18 when film 30 is stretched or otherwise subjected to strain.

Figure 2D:
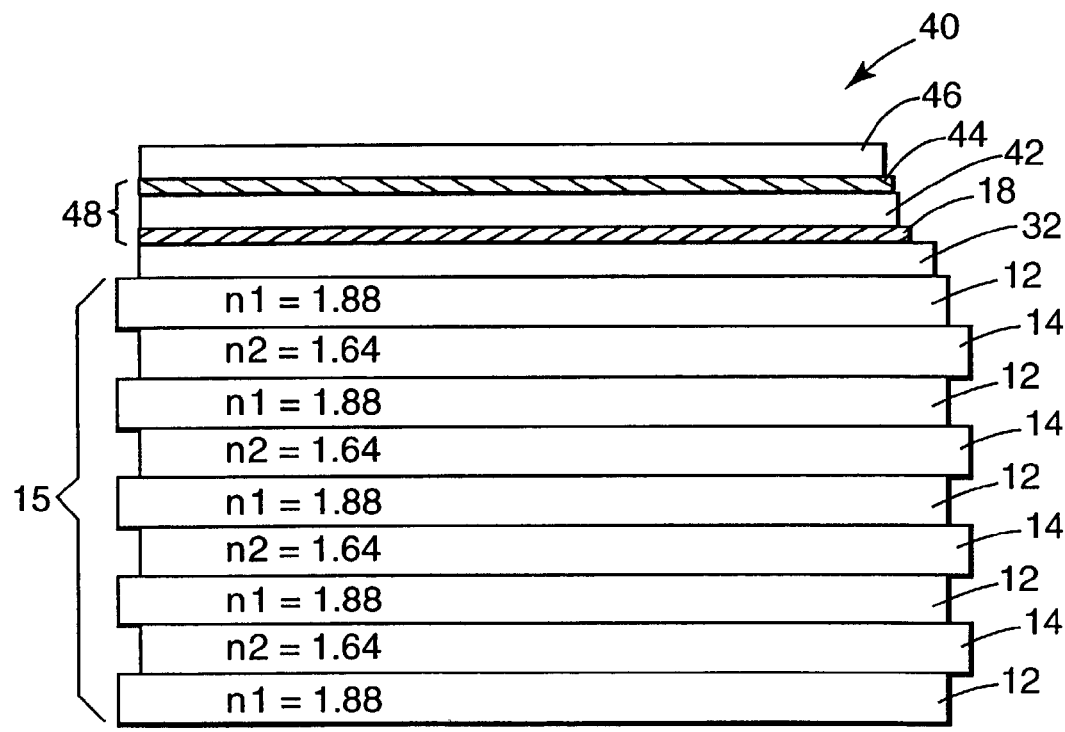

In FIG. 2D a fourth film 40 of the invention is shown in cross-sectional schematic view. In film 40, crosslinked polymeric layer 42 lies atop metal layer 18 and serves as a spacing layer between metal layer 18 and second metal layer 44. Crosslinked polymeric protective layer 46 lies atop second metal layer 44. Together, layers 18, 42, 44 form a Fabry-Perot interference filter stack 48. The metal layers 18, 44 in stack 48 are sufficiently thin so that layers 18, 44 and film 40 as a whole are visible light-transmissive. Layers 18, 44 and crosslinked polymeric spacing layer 42 are sufficiently thick so that the reflection band of film 40 as a whole is broadened.

Figure 2E:
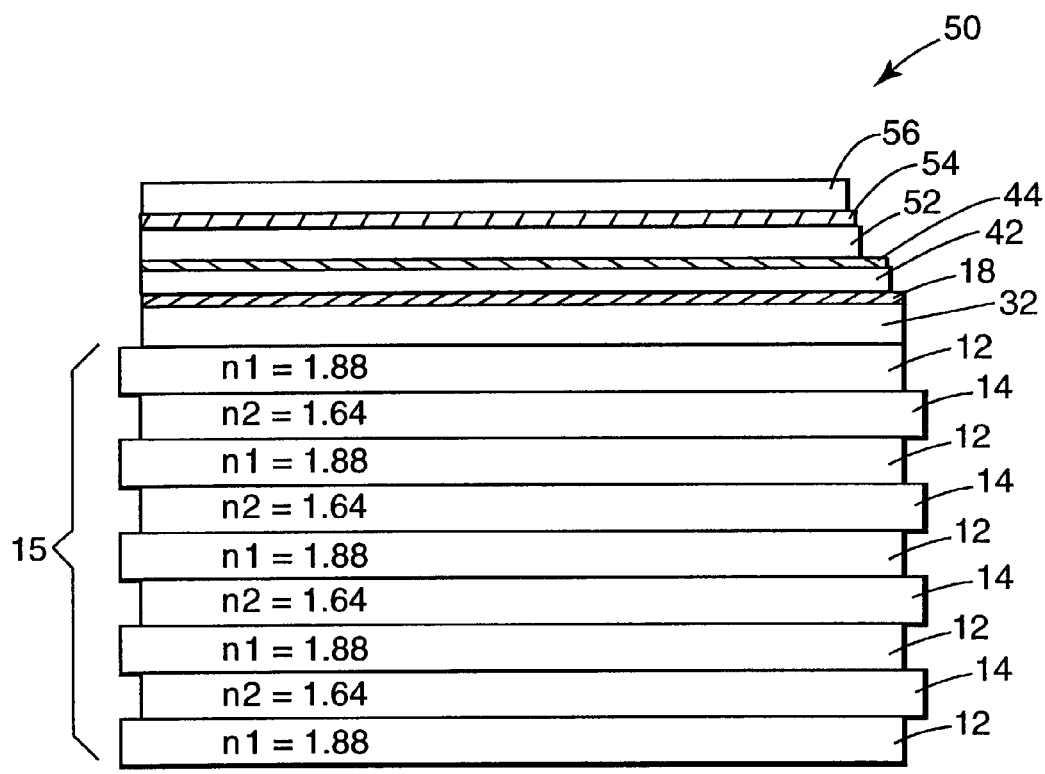

In FIG. 2E a fifth film 50 of the invention is shown in cross-sectional schematic view. Film 50 resembles film 30 but a second crosslinked polymeric layer 52 lies atop second metal layer 44 and serves as a spacing layer between second metal layer 44 and third metal layer 54. Crosslinked polymeric protective layer 56 lies atop third metal layer 54. Layers 18, 44, 54 are sufficiently thin so that layers 18, 44, 54 and film 50 as a whole are visible light-transmissive. Layers 18, 44, 54 and crosslinked polymeric spacing layers 42, 52 are sufficiently thick so that the reflection band of film 50 as a whole is broadened.

Figure 3:
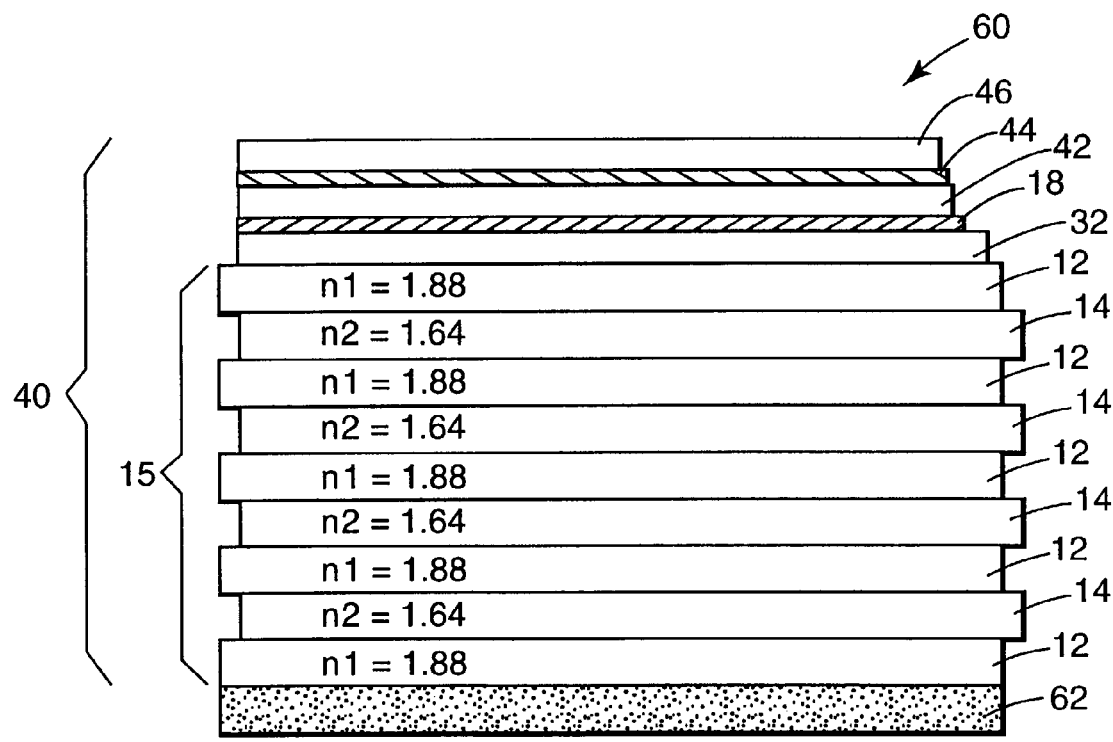
FIG. 3 is a schematic cross-sectional views of a film of the invention having an adhesive backing.

In FIG. 3 an adhesive-backed film 60 of the invention is shown in cross-sectional schematic view. Film 60 is like film 40 of FIG. 2D but has a layer of adhesive 62 on the lowermost surface of support 15. The adhesive permits the mounting of film 60 on a variety of surfaces, including non-planar surfaces and surfaces having a compound curvature.

Figure 4:
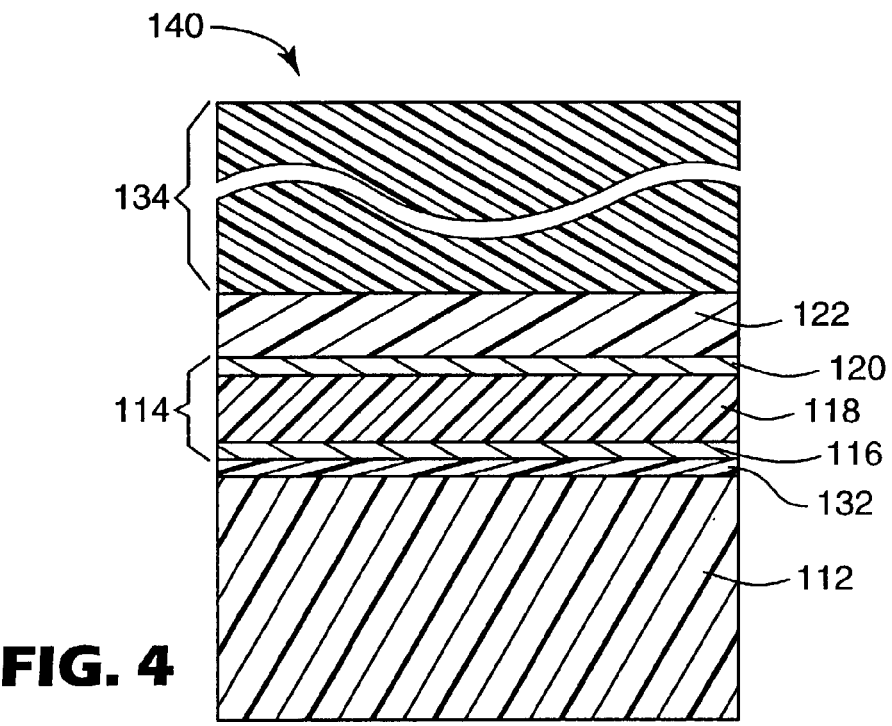
FIG. 4 and FIG. 5 are schematic cross-sectional views of pre-laminates of the invention.

FIG. 4 shows a pre-laminate 140 of the invention. Pre-laminate 140 includes a mechanical energy-absorbing layer 134 made of PVB joined to protective layer 122 of film 130. Film 130 includes MOF support 112 made of alternating layers (not depicted in FIG. 4) of two polyesters. Fabry-Perot interference stack 114 lies atop support 112. Stack 114 includes a first thin layer 116 made of silver, a crosslinked polymeric spacing layer 118 made of a crosslinked acrylate polymer, and a second thin metal layer 120 made of silver. Crosslinked polymeric base coat layer 132 lies between stack 114 and support 112. Optional protective layer 122 made of crosslinked acrylate polymer lies atop stack 114.

Figure 5:
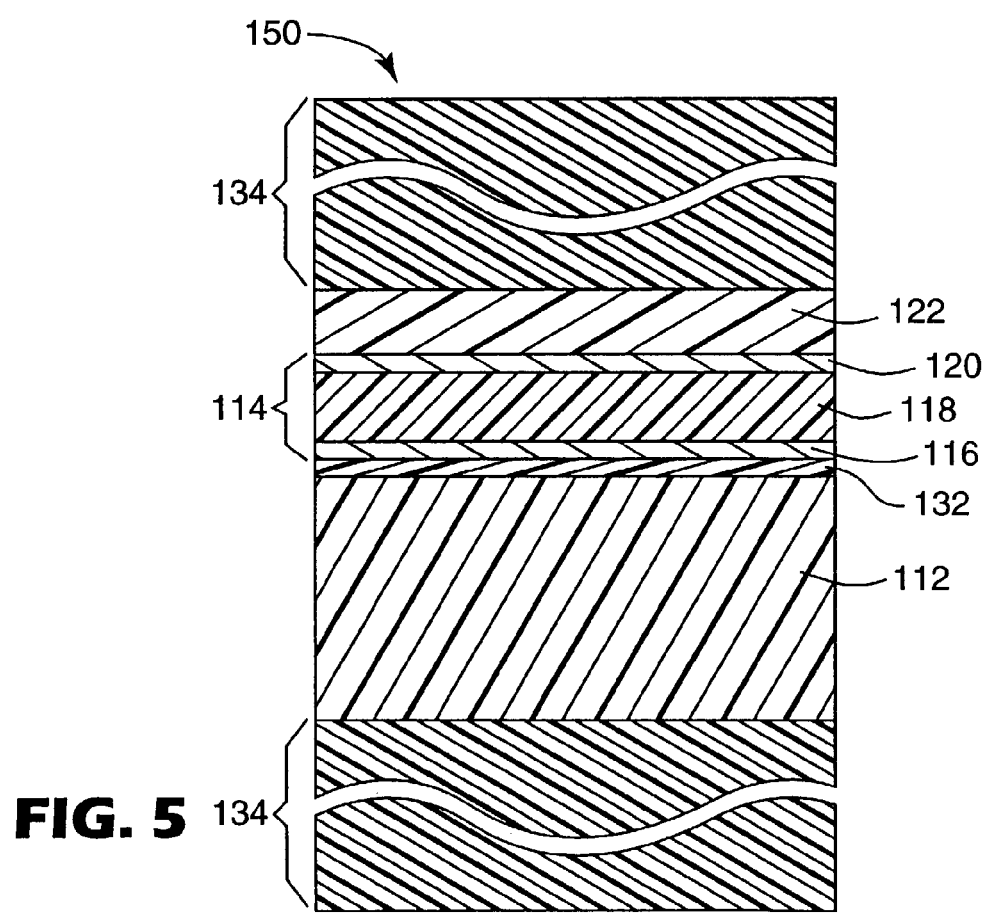

FIG. 5 shows another pre-laminate of the invention 150. Pre-laminate 150 includes a second mechanical energy-absorbing layer 134 joined to MOF support 112 of film 140. This provides a more durable pre-laminate than the pre-laminate shown in FIG. 4.

Figure 6:
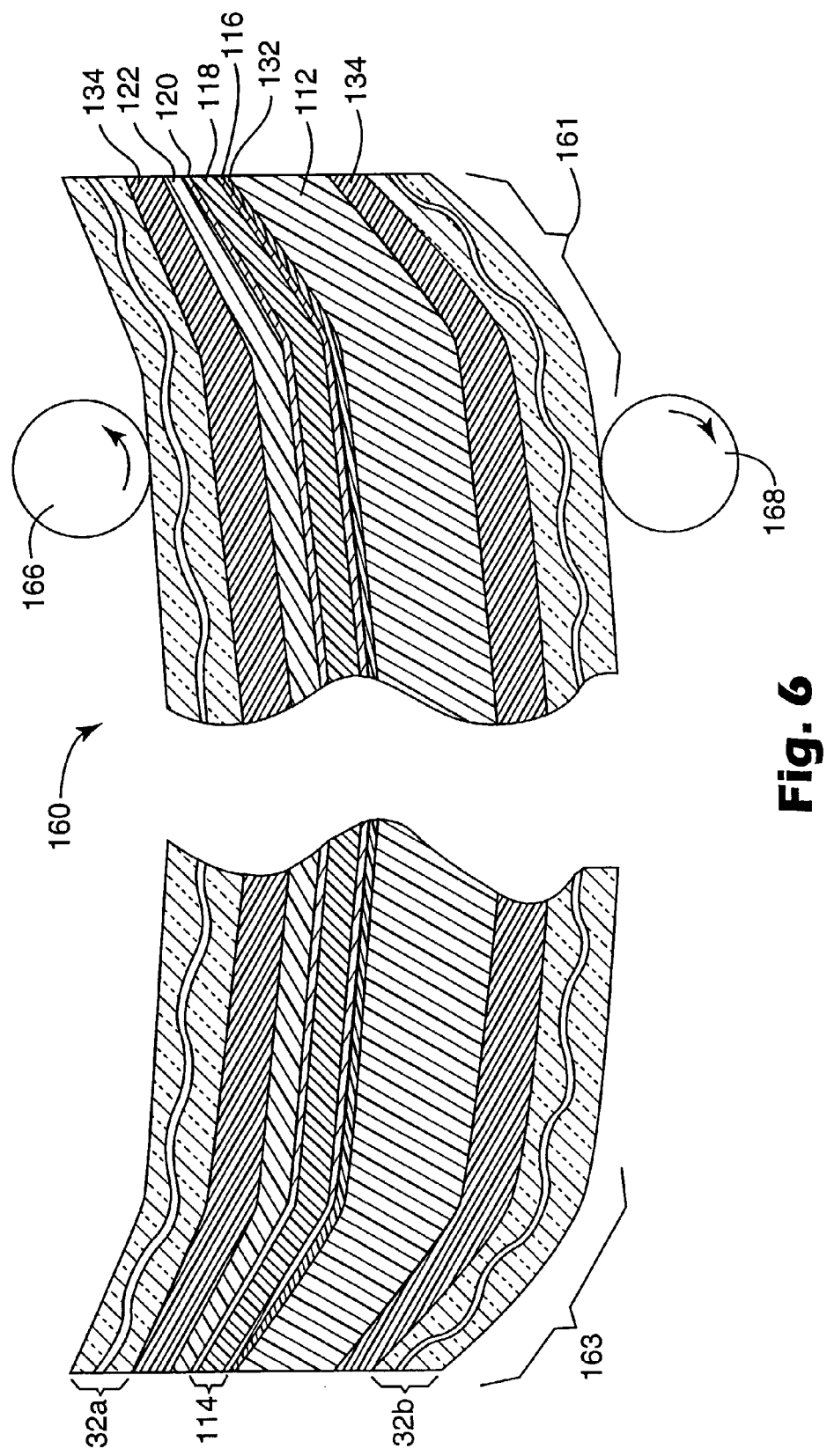
FIG. 6 is a schematic cross-sectional view of a windshield of the invention.

FIG. 6 shows a cross-sectional view of a laminated safety windshield 160 of the invention. Windshield 160 has a continuously curved surface whose radius of curvature is relatively large near the center region (shown only as broken lines in FIG. 6) of windshield 160 but decreases to a relatively small value near the more sharply curved end regions 161 of windshield 160. As shown in FIG. 6, nip rollers 166, 168 are being used to de-air and tack pre-laminate 150 between the two pieces of glass 32a and 32b.

Figure 7:
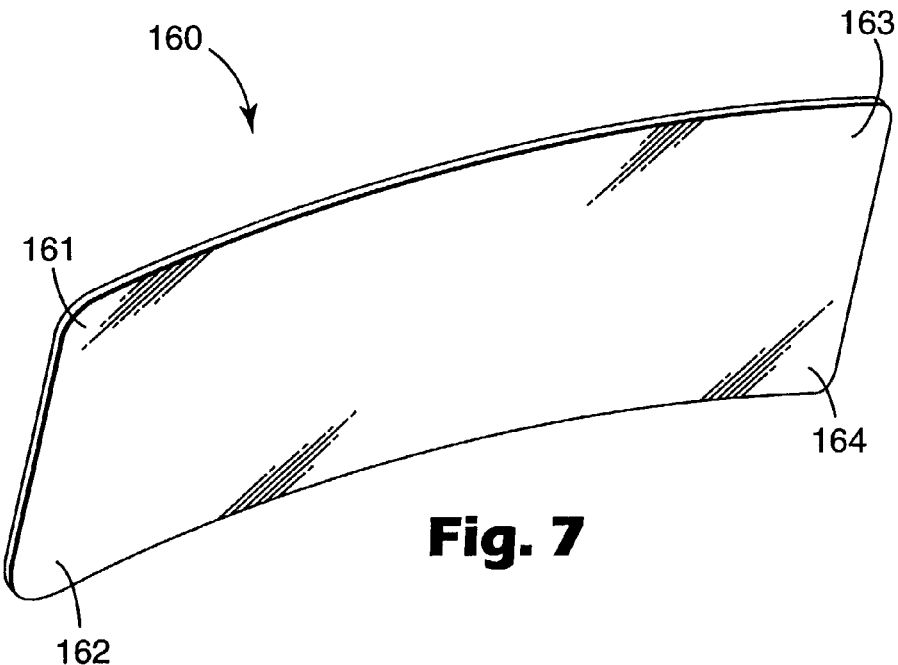
FIG. 7 is a perspective view of the windshield of FIG. 6.

FIG. 7 shows a perspective view of windshield 160 of FIG. 6. Curved regions 161, 162, 163 and 164 have compound curvatures. If pre-laminate 150 shrinks somewhat during the de-airing/lamination and autoclave steps that are used to form windshield 160, then it will be easier to obtain a wrinkle-free appearance through windshield 160.

The films of the invention include a multilayer optical film support. A variety of MOF supports can be employed. A preferred method for preparing a suitable MOF support involves biaxially orienting (stretching along two axes) a suitable multilayer polymeric film. If the adjoining layers have different stress-induced birefringence, biaxial orientation of the multilayer optical film results in differences between refractive indices of adjoining layers for planes parallel to both axes, resulting in the reflection of light of both planes of polarization. A uniaxially birefringent material can have either positive or negative uniaxial birefringence. Positive uniaxial birefringence occurs when the index of refraction in the z direction (nz) is greater than the in-plane indices (nx and ny). Negative uniaxial birefringence occurs when the index of refraction in the z direction (nz) is less than the in-plane indices (nx and ny).

If n1z is selected to match n2x=n2y=n2z and the multilayer optical film is biaxially oriented, there is no Brewster's angle for p-polarized light and thus there is constant reflectivity for all angles of incidence. Multilayer optical films that are oriented in two mutually perpendicular in-plane axes are capable of reflecting an extraordinarily high percentage of incident light depending on factors such as the number of layers, the f-ratio (the ratio of the optical thicknesses in a two component multilayer optical film, see U.S. Pat. No. 6,049,419) and the indices of refraction, and are highly efficient mirrors.

The thicknesses of the layers in the MOF support also affect the reflectance characteristics of the multilayer optical film. All physical thicknesses of MOF layers discussed herein are measured after any orientation or other processing. Adjacent pairs of layers (one having a high index of refraction, and the other a low index) preferably have a total optical thickness that is ½ of the wavelength of the light to be reflected. To achieve maximum reflectivity in a two-component system, the individual layers of the MOF support preferably have an optical thickness that is ¼ of the wavelength of the light to be reflected, although other ratios of optical thicknesses within the layer pairs may be chosen for other reasons. For example, by selecting the MOF layer thicknesses to reflect near infrared light, and positioning the reflective bandedge within the infrared region such that even at grazing angles of incidence the reflectance band does not shift into the visible region of the spectrum, an infrared MOF support can be made transparent in the visible region of the spectrum, even at high angles of incidence.

Preferred MOF supports are highly reflective for both s and p polarized light for any incident direction, and have an average reflectivity of at least 50%, preferably 70%, and more preferably 90%, over at least a 100 nm wide band in a wavelength region of interest. The wavelength region of interest may vary widely depending on the intended application. In a preferred embodiment, the wavelength region of interest is within the infrared region (about 700 nm to about 2000 nm), and the film is engineered to reflect incident radiation over at least a 100 nm wide band in that region. Preferably such an IR reflecting MOF support will also have a visible light transmission of at least about 70% at 550 nm.

In one preferred IR reflecting MOF support embodiment, the MOF support is a two component narrow-band multilayer optical film designed to eliminate visible color due to higher order reflections that occur in the visible region of the spectrum from first order reflecting bands that occur in the IR region above about 1200 nm. The bandwidth of light to be blocked, i.e., not transmitted, by this MOF support at a zero degree observation angle is from approximately 700 to 1200 nm. To further reduce visible color at non-normal angles, the short wavelength bandedge is typically shifted by about 100 to 150 nm away from the long wavelength visible bandedge into the IR so that the reflecting band does not shift into the visible region of the spectrum at maximum use angles. This provides a narrow-band IR reflecting MOF support that reflects from about 850 nm to about 1200 nm at normal angles. For a quarter wave stack, the layer pairs of such an MOF support preferably have optical thicknesses ranging from 425 to 600 nm (½ the wavelength of the light desired to be reflected) to reflect the near infrared light. More preferably, for a quarter wave stack, such an IR reflecting MOF support has individual layers each having an optical thickness ranging from 212 to 300 nm (¼ the wavelength of the light desired to be reflected), to reflect near infrared light.

In another MOF support embodiment, the layer pairs in the MOF support have varying relative thicknesses, referred to herein as a layer thickness gradient, which are selected to achieve the desired bandwidth of reflection over a widened reflection band. For example, the layer thickness gradient may be linear, with the thickness of the layer pairs increasing at a constant rate across the thickness of the MOF support, so that each layer pair is a certain percent thicker than the thickness of the previous layer pair. The layer thicknesses may also decrease, then increase, then decrease again from one major surface of the MOF support to the other, or may have an alternate layer thickness distribution designed to increase the sharpness of one or both bandedges, e.g., as described in U.S. Pat. No. 6,157,490.

In yet another MOF support embodiment, the MOF support can include an extended bandedge two component IR reflecting film construction having a six layer alternating repeating unit as described in U.S. Pat. No. 5,360,659. This construction suppresses the unwanted second, third, and fourth order reflections in the visible wavelength region of between about 380 to about 700 nm, while reflecting light in the infrared wavelength region of between about 700 to about 2000 nm. Reflections higher than fourth order will generally be in the ultraviolet, not visible, region of the spectrum or will be of such a low intensity as to be unobjectionable. Such an MOF support has alternating layers of first (A) and second (B) polymeric materials in which the six layer alternating repeat unit has relative optical thicknesses of about 0.778A.111B.111A.778B.111A.111B. The use of only six layers in the repeat unit results in more efficient use of material and is relatively easy to manufacture. In such an embodiment it is also desirable to introduce a repeat unit thickness gradient as described above across the thickness of the MOF support.

In yet another MOF support embodiment, the two component MOF support can employ a first portion of alternating layers having the above-described six layer alternating repeating unit that reflects infrared light of wave lengths between about 1200–2000 nm, and a second portion of alternating layers having an AB repeat unit and substantially equal optical thicknesses that reflects infrared light of wavelengths between about 700–1200 nm. Such a combination of alternating layers is called a hybrid design and results in broadened reflection of light across the infrared wavelength region. This hybrid design may be provided as described, for example, in U.S. Pat. No. 5,360,659, but has broader application in that it is useful with any of the films described herein. The layer thicknesses of both portions of alternating layers can be adjusted to place the reflecting band within the infrared spectrum so as to minimize any perceived color change with angle.

In yet another MOF support embodiment, the MOF support can include more than two optically distinguishable polymers. A third or subsequent polymer can for example be employed as an adhesion-promoting layer between a first polymer and a second polymer within an MOF support, as an additional component of a stack for optical purposes, as a protective boundary layer between optical stacks, as a skin layer, as a functional coating, or for any other purpose. As such, the composition of a third or subsequent polymer, if any, is not limited. Examples of IR reflecting MOF supports that contain more than two distinguishable polymers include those described in U.S. Reissue No. Re 34,605, incorporated herein by reference. Re 34,605 describes a film including three diverse substantially transparent polymeric materials, A, B, and C and having a repeating unit of ABCB. The layers have an optical thickness of between about 90 nm to about 450 nm, and each of the polymeric materials has a different index of refraction, $n_i$. A layer thickness gradient can also be introduced across the thickness of such an MOF support, with the layer thicknesses preferably increasing monotonically across the thickness of the MOF support. Preferably, for a three component system, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials. Any or all of the polymeric materials may be synthesized to have the desired index of refraction by utilizing a copolymer or miscible blend of polymers.

Yet another MOF support embodiment is described in U.S. Pat. No. 6,207,260. The optical films and other optical bodies of that patent exhibit a first order reflection band for at least one polarization of electromagnetic radiation in a first region of the spectrum while suppressing at least the second, and preferably also at least the third, higher order harmonics of the first reflection band. The percent reflection of the first order harmonic remains essentially constant, or increases, as a function of angle of incidence. This is accomplished by forming at least a portion of the MOF support out of polymeric materials A, B, and C which are arranged in a repeating sequence ABC, wherein A has refractive indices $n_x^A$, $n_y^A$, and $n_z^A$ along mutually orthogonal axes x, y, and z, respectively, B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively, where axis z is orthogonal to the plane of the film or optical body, wherein $n_x^A > n_x^B > n_x^C$ or $n_y^A > n_y^B > n_y^C$, and wherein $n_z^C \geq n_z^B \geq n_z^A$. Preferably, at least one of the differences $n_z^A - n_z^B$ and $n_z^B - n_z^C$ is less than or equal to about −0.05. By designing the MOF support within these constraints, at least some combination of second, third and fourth higher-order reflections can be suppressed without a substantial decrease of the first harmonic reflection with angle of incidence, particularly when the first order reflection band is in the infrared region of the spectrum.

In yet another MOF support embodiment, any of the above described MOF supports can be combined with a "gap-filler" component that increases the optical efficiency of the MOF support when the reflecting band is selectively positioned away from the visible region of the spectrum to minimize perceived color change with angle. Such a component works at normal angles to absorb or reflect IR radiation in the region between the edge of the visible spectrum and the short wavelength bandedge of the IR reflecting band. Such an MOF support is described more fully in U.S. Pat. No. 6,049,419.

The materials selected for the layers in the stack also determine the reflectance characteristics of the MOF support. Many different materials may be used, and the exact choice of materials for a given application depends on the desired match and mismatch obtainable in the refractive indices between the various optical layers along a particular axis, as well as on the desired physical properties of the finished film. For simplicity, the discussion that follows will concentrate on MOF supports containing layer pairs made from only two materials, referred to herein as the first polymer and the second polymer. For discussion purposes the first polymer will be assumed to have a stress optical coefficient with a large absolute value. Thus the first polymer will be capable of developing a large birefringence when stretched. Depending on the application, the birefringence may be developed between two orthogonal directions in the plane of the MOF support, between one or more in-plane directions and the direction perpendicular to the MOF support film plane, or a combination of these. The first polymer should maintain birefringence after stretching, so that the desired optical properties are imparted to the finished MOF support.

To make a reflective, or mirror, MOF support, the refractive index criteria apply equally to any direction in the film plane. It is typical for the indices of any given layer to be equal or nearly so in orthogonal in-plane directions. Preferably, however, the in-plane indices of the first polymer differ as much as possible from the in-plane indices of the second polymer. If before orientation the first polymer has an index of refraction higher than that of the second polymer, the in-plane indices of refraction of the first polymer preferably increase in the direction of stretch, and the z-axis index preferably decreases to match that of the second polymer. Likewise, if before orientation the first polymer has an index of refraction lower than that of the second polymer, the in-plane indices of refraction of the first polymer preferably decrease in the direction of stretch, and the z-axis index preferably increases to match that of the second polymer. The second polymer preferably develops little or no birefringence when stretched, or develops birefringence of the opposite sense (positive-negative or negative-positive), such that its in-plane refractive indices differ as much as possible from those of the first polymer in the finished MOF support. These criteria may be combined appropriately with those listed above for polarizing films if an MOF support is meant to have some degree of polarizing properties as well.

For most applications, preferably neither the first nor the second MOF support polymer has appreciable absorbance bands within the bandwidth of interest. Thus, all incident light within the bandwidth will be either reflected or transmitted. However, for some applications, it may be useful for one or both of the first and second polymers to absorb specific wavelengths, either totally or in part.

The MOF support can also contain optional non-optical layers as described in more detail below. Preferably the optical layers of the MOF support (e.g., the first and second polymer layers) and the optional non-optical layers of the MOF support are composed of polymers. The polymers can be formed using comonomers. Preferably, the use of such comonomers should not substantially impair the stress optical coefficients of the MOF support layers or the retention of birefringence after stretching. In practice, this will impose a practical upper limit on the comonomer content, the exact value of which will vary with the choice of comonomer(s) employed. Some compromise in optical properties may be accepted, however, if comonomer incorporation results in improvement of other properties.

Polyesters are preferred first polymers for use in making the MOF support, and generally include carboxylate and glycol subunits generated by reactions of carboxylate monomers with glycol monomers. Each carboxylate monomer has two or more carboxylic acid or ester functional groups and each glycol monomer has two or more hydroxy functional groups. The carboxylate monomers may all be the same or there may be two or more different types of molecules. The same applies to the glycol monomers. Also included within the term "polyester" are polycarbonates derived from the reaction of glycol monomers with esters of carbonic acid.

Preferred carboxylate monomers for use in forming the carboxylate subunits of polyester layers in an MOF support include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to $C_1$–$C_{10}$ straight-chained or branched alkyl groups.

Preferred glycol monomers for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbonanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis (2-hydroxyethoxy)benzene.

Polyethylene naphthalate ("PEN") is a particularly useful polyester for use in making the MOF support, and often is selected as the first polymer. PEN can be made, for example, by reaction of a naphthalene dicarboxylic acid with ethylene glycol. Polyethylene 2,6-naphthalate is a particularly preferred PEN. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the MOF support to greater stretch ratios and holding other stretching conditions fixed. Other semicrystalline naphthalene dicarboxylic polyesters suitable as first polymers include, for example, polybutylene 2,6-naphthalate ("PBN"), polyethylene terephthalate ("PET"), and copolymers thereof. Non-polyester polymers are also useful in creating MOF supports. For example, polyether imides can be used with polyesters such as PEN or a PEN copolymer ("coPEN"), to generate a multilayer reflective mirror. Other polyester/non-polyester combinations, such as PET and polyethylene (e.g., the poly (ethylene-co-octene) or "PE-PO" available from Dow-Dupont Elastomers under the trade designation ENGAGE™ 8200), can also be used. Other suitable first polymers are described, for example, in U.S. Pat. Nos. 6,268,961 and 6,498,683, in PCT Published Application Nos. WO 99/36248 and WO 99/36262, the disclosures of which are incorporated herein by reference. Another preferred first polymer is a coPEN with carboxylate subunits derived from 90 mol % dimethyl naphthalene dicarboxylate and 10 mol % dimethyl terephthalate and glycol subunits derived from 100 mol % ethylene glycol subunits and with an intrinsic viscosity ("IV") of 0.48 dL/g. The index of refraction is approximately 1.63. The polymer is referred to herein as "low melt PEN (90/10)". Yet another preferred first polymer is a PET having an IV of 0.74 dL/g, available from Eastman Chemical Company.

As noted above, the second polymer in the MOF support preferably is chosen so that the refractive index of the second polymer differs significantly, in at least one direction in the finished MOF support, from the index of refraction of the first polymer in the same direction. Because polymeric materials are typically dispersive, that is, their refractive indices vary with wavelength, these conditions must be considered in terms of a particular spectral bandwidth of interest. It will be understood from the foregoing discussion that the choice of a second polymer is dependent not only on the intended application of the film of the invention, but also on the choice made for the first polymer and upon the MOF support and film processing conditions. The second optical layers can be made from a variety of second polymers having a glass transition temperature compatible with that of the first polymer and having a refractive index similar to the isotropic refractive index of the first polymer. Examples of suitable second polymers include vinyl polymers and copolymers made from monomers such as vinyl naphthalenes, styrene, maleic anhydride, acrylates, and methacrylates. Further examples of such polymers include polyacrylates, polymethacrylates such as poly (methyl methacrylate) ("PMMA"), and isotactic or syndiotactic polystyrene. Other suitable second polymers include condensation polymers such as polysulfones, polyamides, polyurethanes, polyamic acids, and polyimides. The second optical layers in the MOF support can also be formed from polymers such as polyesters and polycarbonates.

Preferred MOF support second polymers include homopolymers of PMMA such as those available from Ineos Acrylics, Inc. under the trade designations CP71 and CP80, and polyethyl methacrylate ("PEMA") which has a lower glass transition temperature than PMMA. Additional preferred second polymers include copolymers of PMMA ("coPMMA"), e.g., a coPMMA made from 75 wt % methylmethacrylate ("MMA") monomers and 25 wt % ethyl acrylate ("EA") monomers such as that available from Ineos Acrylics, Inc., under the trade designation PERSPEX™ CP63; a coPMMA formed with MMA comonomer units and n-butyl methacrylate ("nBMA") comonomer units; and a blend of PMMA and poly(vinylidene fluoride) ("PVDF") such as that available from Solvay Polymers, Inc. under the trade designation SOLEF™ 1008. Yet other preferred second polymers include polyolefin copolymers such as the above-mentioned PE-PO ENGAGE™ 8200; poly (propylene-co-ethylene) ("PPPE") available from Fina Oil and Chemical Co. under the trade designation Z9470; and a copolymer of atatctic polypropylene ("aPP") and isotatctic polypropylene ("iPP") available from Huntsman Chemical Corp. under the trade designation REXFLEX™ W111. Second optical layers can also be made from a functionalized polyolefin, e.g., a linear low density polyethylene-g-maleic anhydride ("LLDPE-g-MA") such as that available from E. I. duPont de Nemours & Co., Inc. under the trade designation BYNEL™ 4105; from a copolyester ether elastomer ("COPE") such as that available from Eastman Chemical Company under the trade designation ECDEL™; from syndiotactic polystyrene ("sPS"); from a copolymer or blend based upon terephthalic acid ("coPET"); from a copolymer of PET employing a second glycol, e.g., cyclohexanedimethanol ("PETG"); and from a fluoropolymer available from Minnesota Mining and Manufacturing Company (3M) under the trade designation THV™.

Particularly preferred combinations of first/second polymers for optical layers in IR reflective MOF support films include PEN/PMMA, PET/PMMA or PET/coPMMA, PEN/COPE, PET/COPE, PEN/sPS, PET/sPS, PEN/coPET, PEN/PETG, and PEN/THV. Several of these combinations provide constant reflectance with respect to the angle of incident light (that is, there is no Brewster's angle). For example, at a specific wavelength, the in-plane refractive indices might be 1.76 for biaxially oriented PEN, while the in-plane z-axis refractive index might fall to 1.49. When PMMA is used as the second polymer in the multilayer construction, its refractive index at the same wavelength might be 1.495 in all three directions. Another example is the PET/COPE system, in which the analogous in-plane and z-axis indices might be 1.66 and 1.51 for PET, while the isotropic index of COPE might be 1.52.

The MOF support optionally includes one or more non-optical layers, e.g., one or more non-optical skin layers or one or more non-optical interior layers such as a protective boundary layer ("PBL") between packets of optical layers. Non-optical layers can be used to give further strength or rigidity to the MOF support or to protect it from harm or damage during or after processing. For some applications, it may be desirable to include one or more sacrificial protective skins, wherein the interfacial adhesion between the skin layer(s) and the MOF support is controlled so that the skin layers can be stripped from the MOF support or from the underside of the finished film before use. Materials may also be chosen for the non-optical layers to impart or improve various properties, e.g., tear resistance, puncture resistance, toughness, weatherability, and solvent resistance of the MOF support or of the films of the invention. Typically, one or more of the non-optical layers are placed so that at least a portion of the light to be transmitted, polarized, or reflected by MOF support or the films of the invention also travels through these layers (in other words these non-optical layers can be placed in the path of light that travels through or is reflected by the MOF support or the films of the invention). The non-optical layers preferably do not substantially affect the reflective properties of the MOF support or the films of the invention over the wavelength region of interest. Properties of the non-optical layers such as crystallinity and shrinkage characteristics may need to be considered along with the properties of the MOF support optical layers in order to provide a film that does not crack or wrinkle when laminated to severely curved substrates.

The non-optical layers in such an MOF support can be selected from many appropriate materials. Factors to be considered in selecting a material for a non-optical layer include percent elongation to break, Young's modulus, tear strength, adhesion to interior layers, percent transmittance and absorbance in an electromagnetic bandwidth of interest, optical clarity or haze, refractive indices as a function of frequency, texture, roughness, melt thermal stability, molecular weight distribution, melt rheology, coextrudability, miscibility and rate of inter-diffusion between materials in the optical and non-optical layers, viscoelastic response, relaxation and crystallization behavior under draw conditions, thermal stability at use temperatures, weatherability, ability to adhere to coatings and permeability to various gases and solvents. Of course, as previously stated, it is important that the chosen non-optical layer material not have optical properties deleterious to those of the MOF support. The non-optical layers may be formed from a variety of polymers, such as polyesters, including any of the polymers used in the first and second optical layers of the MOF support. In some embodiments, the material selected for a non-optical layer will be similar to or the same as the material selected for the second optical layers. For example, use of coPEN, coPET, or other copolymer material for a skin layer can reduce the "splittiness" (the breaking apart of an MOF support due to strain-induced crystallinity and alignment of a majority of the polymer molecules in the direction of orientation) of the MOF support. Non-optical layers containing coPEN typically will orient very little when stretched under the conditions used to orient the first optical layers, and thus have little strain-induced crystallinity.

Preferably, the polymers of the first optical layers, the second optical layers and the optional non-optical layers in the MOP support are chosen to have similar rheological properties (e.g., melt viscosities) so that they can be co-extruded without flow disturbances. Preferably the second optical layers, skin layers and optional other non-optical layers in the MOF support have a glass transition temperature ("Tg") that is either below or no greater than about 40° C. above the glass transition temperature of the first optical layers. More preferably the Tg of the second optical layers, skin layers, and optional non-optical layers is below the Tg of the first optical layers. When length orientation ("LO") rollers are used to orient the MOF support, it may not be possible to use desired low Tg skin materials, because a low Tg material may stick to the rollers. If LO rollers are not used, then this limitation is not an issue. For some applications, preferred skin layer materials include PMMA and polycarbonate because of the durability of these materials and their ability to protect the MOF support from UV radiation.

A skin layer can also be coextruded on one or both major surfaces of the MOF support during its manufacture to protect the MOF support optical layers from the high shear conditions along the feedblock and die walls. In addition, a skin layer having desirable chemical or physical properties can be obtained by mixing one or more suitable additives, e.g., a UV stabilizer, into the polymer melt that makes up the skin layer and coextruding the resulting skin layer onto one or both sides of the MOF support layers during manufacture. If desired, additional layers can be coextruded on the outside of the skin layers during manufacture of the MOF support; they may be coated onto the MOF support in a separate coating operation; or they may be laminated to the MOF support as a separate film, foil, or rigid or semi-rigid reinforcing substrate.

The skin layers and other optional non-optical layers in the MOF support can be thicker than, thinner than, or the same thickness as the optical layers of the MOF support. The thickness of the skin layers and optional non-optical layers is generally at least four times, typically at least 10 times, and can be at least 100 times the thickness of at least one of the individual optical layers of the MOF support. The thickness of the non-optical layers can be varied to make an MOF support having a particular thickness. The overall physical thickness of the MOF support will depend on the desired application. Preferably the MOF support is about 0.01 to about 1 mm thick.

Techniques for manufacturing particularly preferred MOF supports are described in detail in the above-mentioned PCT Published Application Nos. WO 99/36248 and WO 01/96104, the disclosures of which are incorporated herein by reference.

The films of the invention also include a metal or metal layer and a crosslinked polymeric layer atop the MOF support. These layers can be present in either order, viz., with the metal or metal alloy layer between the MOF support and the crosslinked polymeric layer, or with the crosslinked polymeric layer between the MOF support and the metal or metal alloy layer. Preferably, more than one metal or metal alloy layer is present in a film of the invention. As noted above, these metal or metal alloy layers can be referred to as metal layers for brevity. Most preferably, the films of the invention include at least two metal layers separated by a crosslinked polymeric spacing layer, with the metal layers and crosslinked polymeric spacing layer forming an infrared-rejecting Fabry-Perot optical interference stack. More than one such stack can be present in the film if desired. Additional stacks can conveniently be formed by placing additional crosslinked polymeric layers and metal layers atop the previous stack(s).

The first, second and any additional metal layers in the film can be the same as or different from one another. Preferred metals include elemental silver, gold copper, nickel, chrome, and stainless steel, with silver being especially preferred. Alloys or dispersions containing these metals in admixture with one another or with other metals also can be employed. The metal layers need not have the same thickness. Preferably the metal layers are sufficiently thick so as to be continuous, and sufficiently thin so as to ensure that the film and articles containing the film will have the desired degree of visible light transmission. Preferably the physical thickness (as opposed to the optical thickness) of the metal layers is about 3 to about 50 nm, more preferably about 4 to about 15 nm. The first and any additional metal layers preferably are applied using techniques employed in the film metallizing art such as sputtering (e.g., cathode or planar magnetron sputtering), evaporation (e.g., resistive or electron beam evaporation), chemical vapor deposition, plating and the like.

In addition to their optical function, the metal layers can be used for purposes such as antennae, electromagnetic shielding, and for thin film heating applications such as de-fogging, de-misting, defrosting or deicing. Thin film heating applications can require substantial current-carrying ability. Preferably in such thin film heating applications two or more of the metallized film layers are electrically connected together in parallel using busbars, e.g., as shown in U.S. Pat. Nos. 3,529,074, 4,782,216, 4,786,783, 5,324,374 and 5,332,888. The combination of multiple current-carrying metal layers separated by crosslinked polymeric spacing layers provides a stack having increased resistance to delamination or fracture when subjected to bending, flexing and stretching, as described in more detail in copending application Ser. No. 10/222,449 filed Aug. 17, 2002 and entitled "FLEXIBLE ELECTRICALLY CONDUCTIVE INFRARED INTERFERENCE FILTER" and in copending application Ser. No. 10/222,465 filed Aug. 17, 2002 and entitled "DURABLE TRANSPARENT EMI SHIELDING FILM", both incorporated herein by reference. Even very small scratches or fractures within the metal layer can cause early failure of current-carrying embodiments of the film. Such failures often are due to hot spot formation, especially when the scratch or fracture is perpendicular to the direction of current flow through the metal layer. Preferably the layers will maintain electrical conductivity after the application of more than 0.15 W/cm$^2$ power to the film.

The smoothness and continuity of the first metal layer and its adhesion to the support preferably are enhanced by appropriate pretreatment of the support. A preferred pretreatment regimen involves electrical discharge pretreatment of the support in the presence of a reactive or non-reactive atmosphere (e.g., plasma, glow discharge, corona discharge, dielectric barrier discharge or atmospheric pressure discharge); chemical pretreatment; flame pretreatment; or application of a nucleating layer such as the oxides and alloys described in U.S. Pat. Nos. 3,601,471 and 3,682,528. These pretreatments help ensure that the surface of the support will be receptive to the subsequently applied metal layer. Plasma pretreatment is particularly preferred. A further particularly preferred pretreatment regimen involves coating the support with an inorganic or organic base coat layer such as layer 132 of FIG. 4, discussed above, optionally followed by further pretreatment using plasma or one of the other pretreatments described above. Organic base coat layers, and especially crosslinked polymeric base coat layers, are especially preferred. Accordingly, in a preferred embodiment of the invention, the crosslinked polymeric layer lies between the MOF support and the metal layer.

The crosslinked polymeric layer can be applied to the MOF support (or to the first metal layer atop the support) in a variety of ways. Most preferably, the crosslinked polymeric layer is formed by flash evaporation and vapor deposition of a radiation-crosslinkable monomer (e.g., an acrylate monomer), followed by crosslinking in situ (using, for example, an electron beam apparatus, UV light source, electrical discharge apparatus or other suitable device), as described in U.S. Pat. Nos. 4,696,719, 4,722,515, 4,842,893, 4,954,371, 5,018,048, 5,032,461, 5,097,800, 5,125,138, 5,440,446, 5,547,908, 6,045,864, 6,231,939 and 6,214,422; in published PCT Application No. WO 00/26973; in D. G. Shaw and M. G. Langlois, "A New Vapor Deposition Process for Coating Paper and Polymer Webs", 6th International Vacuum Coating Conference (1992); in D. G. Shaw and M. G. Langlois, "A New High Speed Process for Vapor Depositing Acrylate Thin Films: An Update", Society of Vacuum Coaters 36th Annual Technical Conference Proceedings (1993); in D. G. Shaw and M. G. Langlois, "Use of Vapor Deposited Acrylate Coatings to Improve the Barrier Properties of Metallized Film", Society of Vacuum Coaters 37th Annual Technical Conference Proceedings (1994); in D. G. Shaw, M. Roehrig, M. G. Langlois and C. Sheehan, "Use of Evaporated Acrylate Coatings to Smooth the Surface of Polyester and Polypropylene Film Substrates", RadTech (1996); in J. Affinito, P. Martin, M. Gross, C. Coronado and E. Greenwell, "Vacuum deposited polymer/metal multilayer films for optical application", Thin Solid Films 270, 43–48 (1995); and in J. D. Affinito, M. E. Gross, C. A. Coronado, G. L. Graff, E. N. Greenwell and P. M. Martin, "Polymer-Oxide Transparent Barrier Layers", Society of Vacuum Coaters 39th Annual Technical Conference Proceedings (1996). If desired, the crosslinked polymeric layer can also be applied using conventional prepolymer coating methods such as roll coating (e.g., gravure roll coating) or spray coating (e.g., electrostatic spray coating), then crosslinked using, for example, UV radiation. The desired chemical composition and thickness of the crosslinked polymeric layer will depend in part on the nature of the MOF support. For example, for an MOF support, the crosslinked polymeric layer preferably is formed from an acrylate monomer and typically will have a thickness of only a few nm up to about 2 micrometers.

The crosslinked polymeric layer can be formed from a variety of organic materials. Preferably the spacing layer is crosslinked in situ after it is applied. Most preferably the crosslinked polymeric layer is formed by flash evaporation, vapor deposition and crosslinking of a monomer as described above. Volatilizable (meth)acrylate monomers are preferred for use in such a process, with volatilizable acrylate monomers being especially preferred. Preferred (meth) acrylates have a number average molecular weight in the range of about 150 to about 600, more preferably about 200 to about 400. Other preferred (meth)acrylates have a value of the ratio of the molecular weight to the number of acrylate functional groups per molecule in the range of about 150 to about 600 g/mole/(meth)acrylate group, more preferably about 200 to about 400 g/mole/(meth)acrylate group. Fluorinated (meth)acrylates can be used at higher molecular weight ranges or ratios, e.g., about 400 to about 3000 molecular weight or about 400 to about 3000 g/mole/(meth)

acrylate group. Coating efficiency can be improved by cooling the support. Particularly preferred monomers include multifunctional (meth)acrylates, used alone or in combination with other multifunctional or monofunctional (meth)acrylates, such as hexanediol diacrylate, ethoxyethyl acrylate, phenoxyethyl acrylate, cyanoethyl (mono)acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl (meth)acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol propane triacrylate, propylated trimethylol propane triacrylate, tris(2-hydroxyethyl)-isocyanurate triacrylate, pentaerythritol triacrylate, phenylthioethyl acrylate, naphthloxyethyl acrylate, IRR-214 cyclic diacrylate from UCB Chemicals, epoxy acrylate RDX80095 from Rad-Cure Corporation, and mixtures thereof. A variety of other curable materials can be included in the crosslinked polymeric layer, e.g., vinyl ethers, vinyl naphthylene, acrylonitrile, and mixtures thereof. The physical thickness of the crosslinked polymeric layer will depend in part upon its refractive index and in part upon the desired optical characteristics of the film stack. For use as an organic spacing layer in an infrared-rejecting Fabry-Perot interference stack, the crosslinked polymeric layer typically will have a refractive index of about 1.3 to about 1.7, and preferably will have an optical thickness of about 75 to about 200 nm, more preferably about 100 to about 150 nm and a corresponding physical thickness of about 50 to about 130 nm, more preferably about 65 to about 100 nm.

Optical modeling can be employed to design suitable layer thicknesses in the articles of the invention. For example, for a 51 micrometer thick PET support coated with a 5 layer infrared-rejecting acrylate/metal/acrylate/metal/acrylate optical stack in which the base coat, crosslinked polymeric spacing layer and topcoat are made of tripropylene glycol diacrylate (refractive index 1.4662) and the metal layers are made of magnetron sputtered silver (refractive index 0.154), two exemplary target structures have respective layer physical thicknesses from the base coat through the topcoat of 129/12/104/12/54 nm or 116/10/116/10/55 nm.

A crosslinked polymeric spacing layer has several advantages over a non-crosslinked polymeric spacing layer. A crosslinked polymeric spacing layer will neither melt nor soften as appreciably with heating as a non-crosslinked polymeric spacing layer, and thus is less likely to flow, deform or thin significantly under the simultaneous influence of temperature and pressure, as during a forming or laminating process. A crosslinked polymeric spacing layer is highly solvent resistant, whereas a non-crosslinked polymeric spacing layer may be dissolved or appreciably softened by solvents such as those used to form the non-crosslinked polymeric spacing layer. Crosslinked polymeric spacing layers can have greater resistance to liquids that may be encountered by the films of the present invention, such as cleaning solutions for window applications and automotive fluids such as gasoline, oil, transmission fluid, etc., for automotive applications. A crosslinked polymeric spacing layer may also have desirable physical properties compared to a non-crosslinked polymeric spacing layer fabricated from a similar polymer, such as higher modulus and stiffness, better elastic recovery when strained or better resilience.

The adhesion of the first metal layer to the crosslinked polymeric layer can be improved by placing the first metal layer between crosslinked polymeric layers. The adhesion can also be improved by including an adhesion-promoting or anticorrosion additive in the crosslinked polymeric layer. This can affect the surface energy or other relevant characteristics of the interface between the crosslinked polymeric layer and the first metal layer. Suitable adhesion-promoting or anticorrosion additives include mercaptans, acids (such as carboxylic acids or organic phosphoric acids), triazoles, dyes and wetting agents. Ethylene glycol bis-thioglycolate (described in U.S. Pat. No. 4,645,714) is a particularly preferred additive. The additive preferably is present in amounts sufficient to obtain the desired degree of increased adhesion, without causing undue oxidation or other degradation of the first metal layer.

If desired, additional crosslinked polymeric spacing layers and metal layers can be applied atop the first metal layer. For example, stacks containing 3 metal layers or 4 metal layers provide desirable characteristics for some applications. Stacks containing 2 to 4 metal layers in which each of the metal layers has a crosslinked polymeric layer adjacent to each of its faces are especially preferred.

The smoothness and continuity of the second metal layer and its adhesion to an underlying layer (e.g., to a crosslinked polymeric spacing layer) preferably are enhanced by appropriate pretreatment of the underlying layer prior to application of the second metal layer, or by inclusion of a suitable additive in the underlying layer. Preferred pretreatments include the support pretreatments described above, with plasma pretreatment of the spacing layer being particularly preferred.

Surprisingly, we have also discovered that when one or both of the above-described pretreatments is employed, and when one or more of the above-described base coat layer additives is incorporated into the monomer mixture used for forming the spacing layer(s), the resistance of the metal layer(s) to corrosion under the influence of an electrical current is markedly enhanced. Plasma treatment is a preferred pretreatment, with a nitrogen plasma being especially preferred. Ethylene glycol bis-thioglycolate is a preferred additive for incorporation into the monomer mixture.

The uppermost metal layer preferably is overcoated with a suitable protective layer such as layer 122 above. If desired, the protective layer can be applied using conventional coating methods such as roll coating (e.g., gravure roll coating) or spray coating (e.g., electrostatic spray coating), then crosslinked using, for example, UV radiation. Most preferably the protective layer is formed by flash evaporation, vapor deposition and crosslinking of a monomer as described above. Volatilizable (meth)acrylate monomers are preferred for use in such a protective layer, with volatilizable acrylate monomers being especially preferred. When the film of the invention includes a protective layer or other surface layer and is laminated between sheets of a mechanical energy-absorbing material such as PVB, the index of refraction of the protective layer or other surface layer can be selected to minimize reflection at the interface caused by any difference in refractive indices between the PVB and the film. The protective layer can also be post-treated to enhance adhesion of the protective layer to a mechanical energy-absorbing material such as PVB. Preferred post-treatments include the support pretreatments described above, with plasma post-treatment of both sides of the film being particularly preferred. Preferred additives for the protective layer include the crosslinked polymeric layer additives described above.

Figure 8:
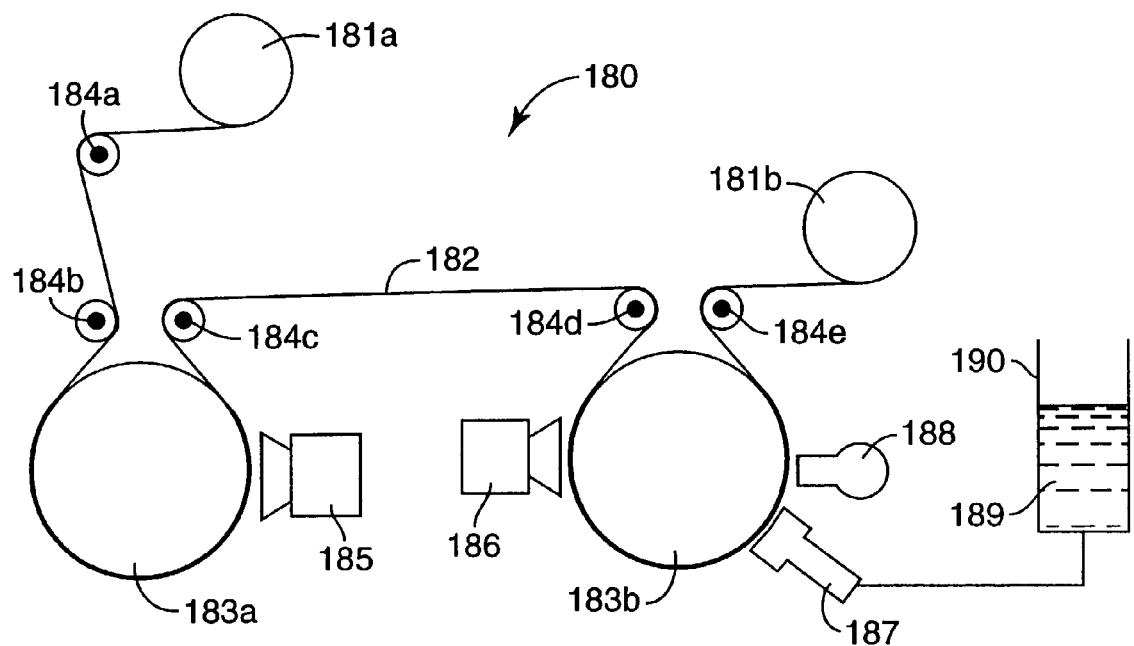
FIG. 8 is a schematic view of an apparatus for carrying out a process of the invention.

An apparatus 180 that can conveniently be used to manufacture the films of the invention is shown in FIG. 8. Powered reels 181a and 181b move MOF support 182 back and forth through apparatus 180. Temperature-controlled rotating drums 183a and 183b and idlers 184a, 184b, 184c, 184d and 184e carry MOF support 182 past metal sputtering applicator 185, plasma pretreater 186, monomer evaporator 187 and E-beam crosslinking apparatus 188. Liquid monomer 189 is supplied to evaporator 187 from reservoir 190. Successive layers can be applied to MOF support 182 using multiple passes through apparatus 180. Apparatus 180 can be enclosed in a suitable chamber (not shown in FIG. 8) and maintained under vacuum or supplied with a suitable inert atmosphere in order to discourage oxygen, water vapor, dust and other atmospheric contaminants from interfering with the various pretreatment, monomer coating, crosslinking and sputtering steps.

Further details regarding formation of the metal layer and crosslinked polymeric layer in the films of the invention can be found in copending application Ser. No. 10/222,466 filed Aug. 17, 2002 and entitled "POLYMER-METAL INFRARED INTERFERENCE FILTER", incorporated herein by reference.

The pre-laminates of the invention are formed by joining a film of the invention to one or more mechanical energy-absorbing layers such as layers 134. The mechanical energy-absorbing layers can be made from a variety of materials that will be familiar to those skilled in the art, including PVB, polyurethanes ("PURs"), polyvinyl chloride, polyvinyl acetal, polyethylene, ethylene vinyl acetates and SUR-LYN™ resins (E. I. duPont de Nemours & Co.). PVB is a preferred material for the mechanical energy-absorbing layer. The thickness of the mechanical energy-absorbing layer will depend upon the desired application, but typically will be about 0.3 to about 1 mm.

Various functional layers or coatings can be added to the MOF support, films or pre-laminates of the present invention to alter or improve their physical or chemical properties, particularly at one of the surfaces of the MOF support, film or pre-laminate. Such layers or coatings can include, for example, low friction coatings or slip particles to make the MOF support, film or the pre-laminate easier to handle during the manufacturing process; particles to add diffusion properties to the MOF support, film or pre-laminate or to prevent wet-out or Newton's rings when the MOF support, film or pre-laminate is placed next to another film or surface; adhesives such as pressure sensitive adhesives or hot melt adhesives; primers to promote adhesion to adjacent layers; and low adhesion backsize materials for use when the MOF support, film or pre-laminate is to be used in adhesive roll form. The functional layers or coatings can also include shatter resistant, anti-intrusion, or puncture-tear resistant films and coatings, for example, the functional layers described in WO 01/96115. Additional functional layers or coatings can include vibration-damping film layers such as those described in WO 98/26927 and U.S. Pat. No. 5,773,102, and barrier layers to provide protection or to alter the transmissive properties of the MOF support, film or pre-laminate towards liquids such as water or organic solvents or towards gases such as oxygen, water vapor or carbon dioxide. These functional components can be incorporated into one or more of the outermost layers of the MOF support, film or pre-laminate, or they can be applied as a separate film or coating.

For some applications, it may be desirable to alter the appearance or performance of the MOF support, film or pre-laminate, such as by laminating a dyed film layer to the MOF support, film or pre-laminate, applying a pigmented coating to the surface of the MOF support, film or pre-laminate, or including a dye or pigment in one or more of the materials used to make the MOF support, film or pre-laminate. The dye or pigment can absorb in one or more selected regions of the spectrum, including portions of the infrared, ultraviolet or visible spectrum. The dye or pigment can be used to complement the properties of the MOF support, film or pre-laminate, particularly where the MOF support, film or pre-laminate transmits some frequencies while reflecting others. A particularly useful pigmented layer that can be employed in the MOF supports, films or pre-laminates of the invention is described in WO 2001/58989. This layer can be laminated, extrusion coated or coextruded as a skin layer on the MOF support, film or pre-laminate. The pigment loading level can be varied between about 0.01 and about 1.0% by weight to vary the visible light transmission as desired. The addition of a UV absorptive cover layer can also be desirable in order to protect any inner layers of the MOF support or film that may be unstable when exposed to UV radiation.

Additional functional layers or coatings that can be added to the MOF support, film or pre-laminate include, for example, antistatic coatings or films; flame retardants; UV stabilizers; abrasion resistant or hardcoat materials; optical coatings; anti-fogging materials; magnetic or magneto-optic coatings or films; liquid crystal panels; electrochromic or electroluminescent panels; photographic emulsions; prismatic films; and holographic films or images. Additional functional layers or coatings are described, for example, in WO 97/01440, WO 99/36262, and WO 99/36248.

The MOF support, film or pre-laminate can be treated with, for example, inks or other printed indicia such as those used to display product identification, orientation information, advertisements, warnings, decoration, or other information. Various techniques can be used to print on the MOF support, film or pre-laminate, such as, for example, screen printing, inkjet printing, thermal transfer printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% ink systems.

The films and pre-laminates of the invention can be joined or laminated to a wide variety of substrates. Typical substrate materials include glazing materials such as glass (which may be insulated, tempered, laminated, annealed, or heat strengthened) and plastics (such as polycarbonates and polymethylmethacrylate). The invention is especially useful in connection with non-planar substrates, especially those having a compound curvature. The films or pre-laminates of the invention preferably are capable of conforming to such non-planar substrates during a lamination and de-airing process without substantial cracking or creasing.

The films of the invention (or the MOF support on which such a film may be formed) can be oriented and optionally heat set under conditions sufficient to assist the film in conforming without substantial wrinkling to a non-planar substrate. This is especially useful when a non-planar substrate to which a film of the invention is to be laminated has a known shape or curvature, and especially when the substrate has a known severe compound curvature. By individually controlling the shrinkage of the film or MOF support in each in-plane direction, the film can be caused to shrink in a controlled fashion during lamination, especially during nip roll lamination. For example, if the non-planar substrate to which the film is to be laminated has a compound curvature, then the shrinkage of the film can be tailored in each in-plane direction to match the specific curvature characteristics of the substrate in those directions. The in-plane film or MOF support direction having the greatest shrinkage preferably is aligned with the dimension of the substrate having the least curvature, that is, the greatest radius of curvature. In addition to or in place of characterizing curvature according to the radius of curvature, other measurements (such as the depth of a raised or depressed area measured from the geometric surface defined by a major surface of the substrate) can also be used if desired. For lamination to typical non-planar substrates, the film shrinkage preferably will be greater than about 0.4% in both in-plane directions, more preferably greater than about 0.7% in at least one in-plane direction, and most preferably greater than about 1% in at least one in-plane direction. The overall film shrinkage preferably is limited to reduce edge delamination or "pull-in." Thus the film shrinkage preferably is less than about 3% in each in-plane direction, and more preferably less than about 2.5% in each in-plane direction. Shrinkage behavior will primarily be governed by factors such as the film or support materials employed, and the film or support stretch ratio(s), heatset temperature, residence time and toe-in (the decrease in rail spacing in a tenter heatset zone measured relative to a maximum rail setting). Coatings can also change the shrinkage properties of a film. For example, a primer coating may reduce the transverse direction ("TD") shrinkage by about 0.2% to about 0.4% and increase the machine direction ("MD") shrinkage by about 0.1 to about 0.3%. Orienting and heat setting equipment can vary widely, and ideal process settings typically are determined experimentally in each case. Further details regarding techniques for manufacturing MOF supports having targeted shrinkage properties are described in WO 01/96104, the disclosure of which is incorporated herein by reference.

As mentioned above, the films of the invention can initially be laminated to a mechanical energy-absorbing layer or layers to form a pre-laminate such as pre-laminate 140 or 150, and then later laminated to a vehicular glazing sheet or sheets. A sandwich containing the film, the mechanical energy-absorbing layer or layers and the glazing sheet or sheets can also be assembled in a single lamination step. In either case, air should be removed from between the various layers during each lamination step. In general it will be preferable to preheat the film and mechanical energy-absorbing layer or layers in an oven to a temperature below the Tg of the outermost film layer prior to lamination. Preferably, some level of adhesion should be established between the mechanical energy-absorbing layer or layers, the film and the glazing sheet or sheets. However, the mechanical energy-absorbing layer or layers preferably should not become sufficiently soft to flow before the final lamination step takes place. The mechanical energy-absorbing layer or layers preferably should help to tack the edges of the pre-laminate in position so that the film can shrink and form itself to the shape of the completed laminate. The laminate preferably is cooled at a controlled rate after autoclaving to avoid possible wrinkling within the film or delamination at the edges of the film. De-airing can be accelerated using the vacuum de-airing or nip roll processes described above. Preferably de-airing and lamination are carried out using one or more nip rollers. A representative nip roll apparatus is shown in U.S. Pat. No. 5,085,141. Other such devices will be familiar to those skilled in the art.

Following lamination, the laminate preferably is heated in an autoclave to a temperature sufficient to cause the mechanical energy-absorbing layer or layers and the film of the invention to conform to the contours of the glazing sheet or sheets and form a final laminated glazing article. Sufficient pressure should also be applied during lamination to obtain at least partial bonding of the various layers of the laminate. For laminates containing PVB, temperatures of about 138° C. to about 150° C. and pressures of about 0.5 to about 1.5 MPa are typical. The heat and pressure cause the mechanical energy-absorbing layer or layers to flow and spread to fill up voids, form a uniform sandwich construction, and firmly bond the laminate layers together, while removing residual air (or dissolving it in the PVB) in a minimal time frame. Although autoclave cycles can vary significantly, depending on the manufacturer, one typical autoclave cycle involves (a) increasing the temperature and pressure from ambient to about 93° C. and about 0.55 MPa within about 15 minutes, (b) increasing temperature to about 143° C. while holding the pressure at about 0.55 MPa within about 40 minutes, (c) increasing the pressure to about 1.38 MPa while holding the temperature at about 143° C. within about 10 minutes, (d) holding at this maximum temperature and pressure for about 20 minutes, (e) decreasing the temperature and the pressure to about 38° C. and about 1 MPa within about 15 minutes, and (f) decreasing the pressure to ambient within about 4 minutes. The entire autoclave cycle is typically about 60 minutes to about 120 minutes.

Figure 9:
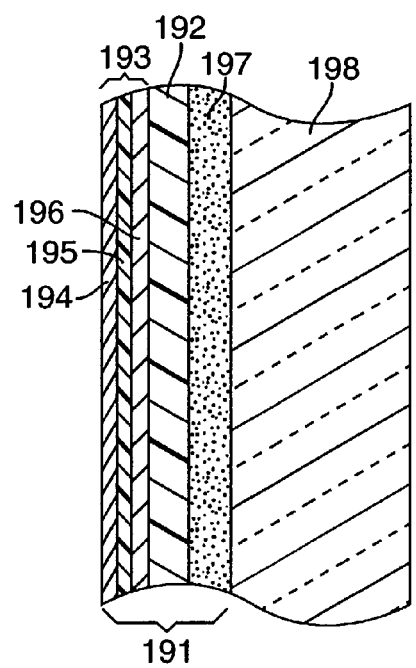
FIG. 9 is a schematic cross-sectional view of architectural glazing of the invention.

The films of the invention can also be employed in architectural glazing, e.g., such as the glazing articles described in U.S. Pat. No. 4,799,745. The manner of making such glazing articles will be apparent to those skilled in the art. For example, useful architectural glazing articles can be made by substituting an MOF support for the interface layer 20 and a crosslinked polymeric layer for the spacing layer 18 in U.S. Pat. No. 4,799,745. The finished glazing articles of the present invention preferably are optically clear. FIG. 9 shows a film 191 of the invention containing MOF support 192 and Fabry-Perot stack 193 containing first and second metal layers 194 and 196 separated by spacing layer 195. Film 191 is joined to a glass sheet 198 using a layer 197 of pressure sensitive adhesive.

The films of the invention can be manufactured much more rapidly than films made using a sputter-coated inorganic dielectric layer or a solvent-applied uncrosslinked polymeric dielectric layer. In the latter two processes the dielectric layer deposition step is a rate-limiting factor, whereas the process of the invention enables much more rapid deposition of the dielectric layer. In addition, the process of the invention can be carried out in a single chamber without removal of the film between coating steps, whereas the reported solvent-applied uncrosslinked dielectric layers appear to have been formed outside the chamber in which deposition of the metal layers took place.

The following tests were used to evaluate films of the invention:

Conductivity vs. Strain Test

Films of the invention were stretched using SINTECH™ 200/S TENSILE TESTER (Instron Corp.) in order to determine the percent strain at which the film would stop conducting electricity. A 25.4 mm wide by about 200 mm long strip was cut from the center of a film sample. The narrow ends of the strip were painted on both sides with No. 22-201 silver paint (Katy Company). After the silver paint dried, copper was folded over the painted edges to form a durable electrode at each end of the strip. The prepared strips were clamped into the jaws of the tensile tester, and alligator clips were used to connect a power supply to the copper electrodes. While using a gauge length of 101.6 mm and a crosshead speed of 25.4 mm/min, a constant voltage of 4 volts was supplied to the strip and the current flow was measured and recorded vs. % strain.

Sheet Resistance Test

Films of the invention were evaluated for sheet resistance using a non-contact conductivity measuring device (Model 717B Benchtop Conductance Monitor, Delcom Instruments Inc.).

Solar Heat Gain Coefficient and Shading Coefficient

The value Te is defined as the ratio, expressed in percent, of the solar energy transmitted by a specimen from 250 nm to 2500 nm divided by the total incident solar energy. The value Ae is defined as the ratio, expressed in percent, of the solar energy absorbed by a specimen from 250 nm to 2500 nm divided by the total incident solar energy. Solar properties are calculated using solar irradiance data from ASTM E891 using air mass 1.5. The Solar Heat Gain Coefficient (SHGC) is calculated as $SHGC=Te+0.27(Ae).$ The Shading Coefficient (SC) is defined as the ratio of the Solar Heat Gain Coefficient through a given glazing to that through a single pane of standard 3.2 mm thick window glass, and is calculated as $SC=SHGC/87.0.$ The invention will now be described with reference to the following non-limiting examples, in which all parts and percentages are by weight unless otherwise indicated.

EXAMPLE 1

(Layer 1) An approximately 6 meter long section of 0.05 mm thick MOF support film (3M™ Solar Reflecting Film No. 41-4400-0146-3) was spliced into an approximately 300 meter long roll of 0.05 mm thick by 508 mm wide PET support (453 MELINEX™, DuPont Teijin Films). The resulting spliced film was loaded into a roll to roll vacuum chamber like that shown in FIG. 8. The pressure in the vacuum chamber was reduced to $3 \times 10^{-4}$ torr. The support was simultaneously plasma pretreated and acrylate coated at a web speed of 36.6 m/min. The plasma pretreatment utilized a chrome target and an unbalanced dc magnetron operated at 1000 watts power (402 volts and 2.5 amps) under a nitrogen atmosphere with a nitrogen gas flow of 102 sccm. The acrylate coating employed a 50:50 mixture of IRR214 acrylate (UCB Chemicals) and lauryl acrylate that had been degassed for 1 hour by placing a container of the liquid monomer mixture into a bell jar and reducing pressure to approximately 1 millitorr. The degassed monomer was pumped at a flow rate of 2.45 ml/min through an ultrasonic atomizer into a vaporization chamber maintained at 276° C. Using a drum temperature of −21° C., the monomer vapor was condensed onto the moving web and electron beam crosslinked using a single filament gun operated at 8.0 kV and 6.5 milliamps.

(Layer 2) The web direction was reversed. Again operating at 36.6 m/min, the acrylate surface was plasma treated and coated with magnetron sputtered silver. The plasma pretreatment was as before but at 309 volts and 3.34 amps. The silver was sputtered at 10,000 watts power (570 volts and 7.88 amps), a drum temperature of 21° C. and an argon atmosphere with an argon gas flow of 93.2 sccm.

(Layer 3) The web direction was again reversed. Again operating at 36.6 n/min, the silver surface was plasma pretreated prior to deposition and crosslinking of a polymeric spacing layer. The plasma pretreatment utilized a chrome target and 1000 watts power (308 volts and 3.33 amps). Using a drum temperature of −23° C. and the other monomer deposition conditions described above, the monomer vapor was condensed onto the moving web and electron beam crosslinked using a single filament gun operated at 8.0 kV and 6.0 milliamps.

(Layer 4) The web direction was again reversed. Again operating at 36.6 m/min, the acrylate surface was plasma pretreated and coated with magnetron sputtered silver. The plasma pretreatment was as before but using 316 volts and 3.22 amps. The silver was sputtered as before but at 567 volts, 17.66 amps, a drum temperature of 20° C. and an argon gas flow of 90 sccm.

(Layer 5) The web direction was again reversed. The silver surface was plasma pretreated prior to deposition of the protective layer. The plasma pretreatment was the same as in Layer 3. Using a drum temperature of −23° C. and the other monomer deposition conditions described above, the monomer vapor was condensed onto the moving web and electron beam crosslinked using a single filament gun operated at 8.0 kV and 6.2 milliamps.

Figure 10:
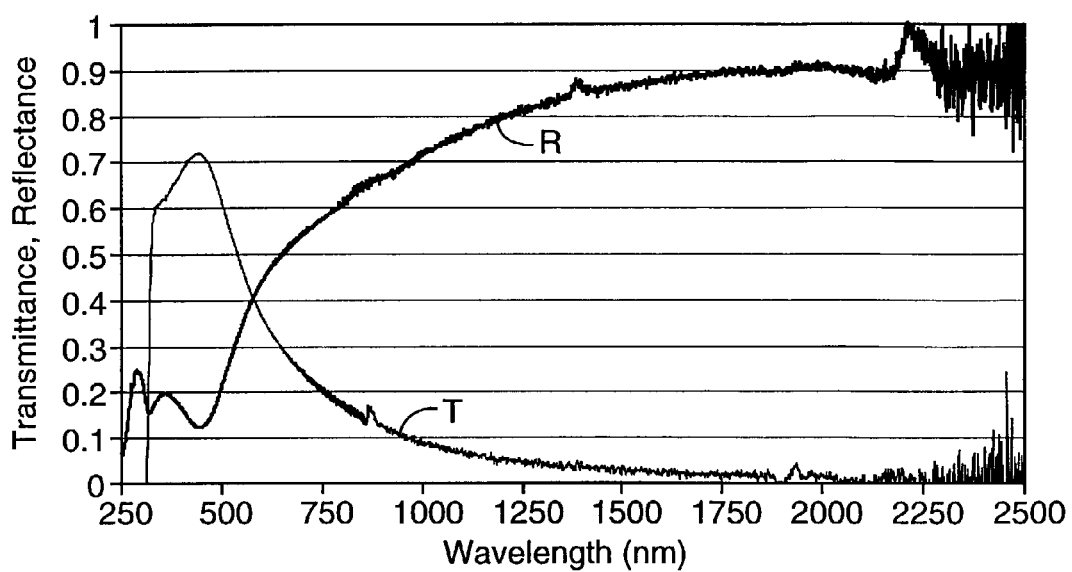
FIG. 10 is a graph showing transmittance and reflectance for a film having a birefringent dielectric multilayer support and a metal layer as shown in Example 1.
Figure 11:
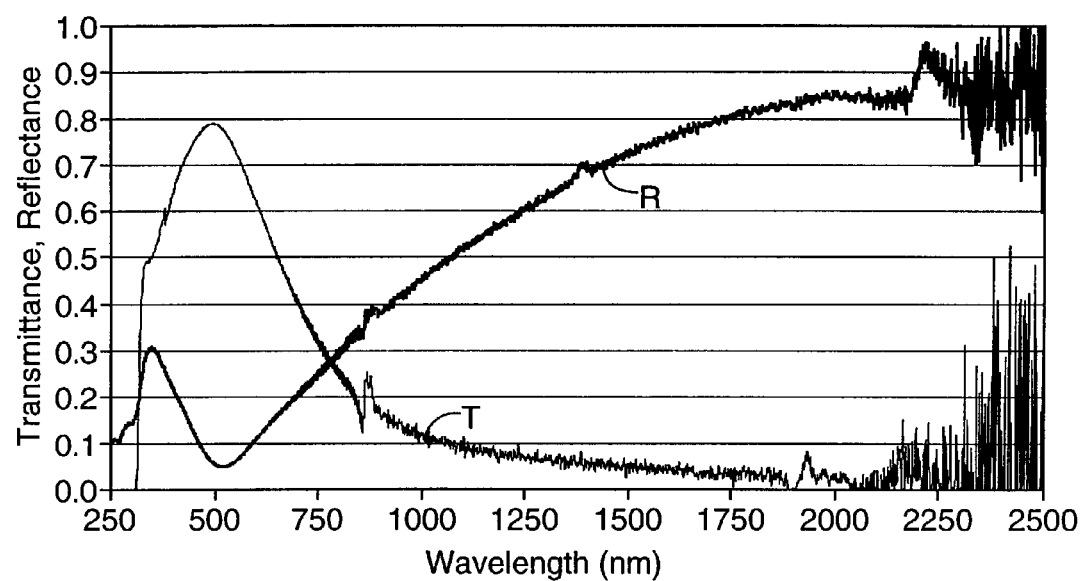
FIG. 11 is a graph showing transmittance and reflectance for the birefringent dielectric multilayer support of FIG. 10 without the metal layer.

Optical properties of the resulting infrared-rejecting film and for the uncoated support are shown in FIG. 10 and FIG. 11, respectively. Curves T and R in each of FIG. 10 and FIG. 11 show transmission and reflection respectively. As can be appreciated by examining the reflection curves between about 700 and about 1100 nm, the infrared-rejecting film of the invention exhibited a significantly broadened reflection band.

EXAMPLES 2 AND 3

Using the method of Example 1, 5 layer infrared-rejecting acrylate/Ag/acrylate/Ag/acrylate optical stacks with an optional topcoat plasma post-treatment were formed on the same MOF support. The resulting films were evaluated for appearance, transmission (Trans-Luminous Y ($T_{vis}$)), reflection (Refl-Luminous Y), solar heat gain coefficient, shading coefficient and sheet resistivity. The processing conditions and evaluation results are set out below in Table 1.

TABLE 1

|  | Ex. 2 | Ex. 3 |
| --- | --- | --- |
| Support | MOF | MOF |
| Layer 1 |  |  |
| Deposited material | Monomers | Monomers |
| Line speed (m/min) | 36.6 | 36.6 |
| Plasma (Watts) | 1000 | 1000 |
| Drum temp (° C.) | −21 | −21 |
| Monomer feed (ml/min) | 2.65 | 2.65 |

TABLE 1-continued

|  | Ex. 2 | Ex. 3 |
|---|---|---|
| Layer 2 | | |
| Deposited material | Ag | Ag |
| Line speed (m/min) | 36.6 | 36.6 |
| Plasma (Watts) | 1000 | 1000 |
| Drum temp (° C.) | 19 | 19 |
| Sputter power (KW) | 10 | 10 |
| Layer 3 | | |
| Deposited material | Monomers | Monomers |
| Line speed (m/min) | 36.6 | 36.6 |
| Plasma (Watts) | 1000 | 1000 |
| Drum temp (° C.) | −20 | −20 |
| Monomer feed (ml/min) | 2.85 | 2.85 |
| Layer 4 | | |
| Deposited material | Ag | Ag |
| Line speed (m/min) | 36.6 | 36.6 |
| Plasma (Watts) | 1000 | 1000 |
| Drum temp (° C.) | 23 | 23 |
| Sputter power (KW) | 10 | 10 |
| Layer 5 | | |
| Deposited material | Monomers | Monomers |
| Line speed (m/min) | 36.6 | 36.6 |
| Plasma (Watts) | 1000 | 1000 |
| Drum temp (° C.) | −17 | −17 |
| Monomer feed (ml/min) | 1.35 | 1.35 |
| Plasma Post-Treatment | | |
| Line speed (m/min) | | 36.6 |
| Plasma (Watts) | | 1000 |
| Results: | | |
| Appearance | Good | Good |
| Trans-Luminous Y ($T_{vis}$) | 72.69 | 72.51 |
| Refl-Luminous Y | 11.16 | 10.15 |
| SHGC | 44.97 | 45.63 |
| SC | 0.5169 | 0.5244 |
| Sheet Resistivity (Ohms/Square) | 3.927 | 4.389 |

The results in Table 1 show the formation of coated films having a $T_{vis}$ as high as about 73% and sheet resistance as low as 3.9 Ohms/square. Two samples of the film of Example 3 were also evaluated using the conductivity vs. strain test. Both film samples conducted current at up to 50% or more strain.

COMPARATIVE EXAMPLE 1

A commercial product based on transparent silver layers and an indium oxide inorganic dielectric (XIR™ 75 film, Southwall Technologies Inc.) was evaluated using the conductivity vs. strain test. The sample failed when subjected to only 1% strain.

EXAMPLE 4

The films of Example 2 and Example 3 were subjected to optional plasma post-treatments on one or both sides of the film, and then laminated between glass sheets by placing a 304 mm by 304 mm sample of the film into the center of a sandwich made from two 0.05 mm thick sheets of PVB placed between two 2 mm glass sheets. The resulting laminate assemblies were de-aired using vacuum, then autoclaved to form an optically clear glazing article. The glazing articles were evaluated to determine their compressive shear strength. Set out below in Table 2 is the Film Example number, presence or absence of plasma post-treatment atop the uppermost layer of the stack or on the underside of the support, and the measured compressive shear strength.

TABLE 2

| Film Example No. | Substrate | Plasma atop Stack | Plasma under Support | Compressive Shear (Mpa) |
|---|---|---|---|---|
| 2 | MOF | No | No | 1.5 |
| 3 | MOF | Yes | No | 6.35 |
| 3 | MOF | Yes | Yes | 15.19 |

Various modifications and alterations of this invention will be apparent to those skilled in the art without departing from this invention. This invention should not be restricted to that which has been set forth herein only for illustrative purposes.

We claim:

1. A process for making a film comprising:
   a) providing a visible light-transmissive birefringent dielectric multilayer support that reflects at least 50% of light in a band at least 100 nm wide in a wavelength region of interest, and
   b) forming in either order atop the support:
      i) a visible light-transmissive metal or metal alloy layer, and
      ii) a crosslinked polymeric layer,
   whereby the thickness of the metal or metal alloy layer is such that the film is at least about 20% visible light-transmissive and its reflection band is broadened with respect to that of the support.

2. A process according to claim 1 wherein the wavelength region of interest is the infrared region.

3. A process according to claim 1 wherein the metal or metal alloy layer is formed between the support and the crosslinked polymeric layer.

4. A process according to claim 1 wherein the crosslinked polymeric layer is formed between the support and the metal or metal alloy layer.

5. A process according to claim 1 wherein the crosslinked polymeric layer is formed by flash evaporation, vapor deposition and crosslinking of a radiation-crosslinkable monomer.

6. A process according to claim 1 wherein the film is extensible.

7. A process according to claim 1 wherein the metal or metal alloy layer comprises silver and the crosslinked polymeric layer comprises an acrylate polymer.

8. A process according to claim 1 further comprising modifying an interface between the metal or metal alloy layer and at least one adjacent layer within the film to enhance interlayer adhesion.

9. A process according to claim 8 wherein plasma treatment is employed between the metal or metal alloy layer and an adjacent layer within the film.

10. A process according to claim 8 wherein plasma treatment is employed between the metal or metal alloy layer and two adjacent layers within the film.

11. A process according to claim 1 further comprising stretching the film without substantial cracking or creasing of the metal or metal alloy layer.

12. A process according to claim 11 wherein the film, if heated, exhibits different shrinkage in two in-plane directions.

13. A process according to claim 1 further comprising heating and joining together the film and at least one layer of a mechanical energy-absorbing material to provide a safety glazing pre-laminate.

14. A process for making a glazing article comprising:
a) assembling a layer of glazing material and a film comprising a birefringent dielectric multilayer support that reflects at least 50% of light in a band at least 100 nm wide in a wavelength region of interest and which has atop the support in either order a crosslinked polymeric layer and a metal or metal alloy layer whose thickness is such that the film is at least about 20% visible light-transmissive and its reflection band is broadened, and
b) bonding the glazing material and film together into a unitary article.

15. A process according to claim 14 wherein the glazing material comprises glass and the article comprises an adhesive layer between the film and the glass.

16. A process for making a laminate article comprising:
a) assembling:
i) a first layer of a glazing material,
ii) a first mechanical energy-absorbing layer,
iii) a visible light-transmissive and infrared-reflective film comprising a birefringent dielectric multilayer support that reflects at least 50% of light in a band at least 100 nm wide in a wavelength region of interest and which has atop the support in either order a crosslinked polymeric layer and a metal or metal alloy layer whose thickness is such that the film is at least about 20% visible light-transmissive and its reflection band is broadened,
iv) a second mechanical energy-absorbing layer and
v) a second layer of gazing material,
so that the film is between the first and second mechanical energy-absorbing layers and the first and second mechanical energy-absorbing layers are between the first and second layers of glazing material,
b) removing residual air from between the layers, and
c) beating and applying pressure to bond the layers together into a unitary article.

17. A process according to claim 16 wherein the removal of residual air or the application of pressure to the layers is performed using at least one nip roll.

18. A process according to claim 16 wherein the glazing material layers are non-planar.

19. A process according to claim 18 wherein the layers are bonded together without substantial cracking, creasing or wrinkling of the film.

20. A process according to claim 16 wherein the crosslinked polymeric layer is formed by flash evaporation, vapor deposition and crosslinking of a radiation-crosslinkable monomer.

21. A process according to claim 16 wherein the crosslinked polymeric layer comprises an acrylate polymer.

22. A film comprising a birefringent dielectric multilayer support that reflects at least 50% of light in a band at least 100 nm wide in a wavelength region of interest and which has atop the support in either order a crosslinked polymeric layer and a metal or metal alloy layer whose thickness is such that the film is at least about 20% visible light-transmissive and its reflection band is broadened with respect to that of the support.

23. A film according to claim 22 wherein the wavelength region of interest is the infrared region.

24. A film according to claim 22 wherein the metal or metal alloy layer is between the support and the crosslinked polymeric layer.

25. A film according to claim 22 wherein the crosslinked polymeric layer is between the support and the metal or metal alloy layer.

26. A film according to claim 22 wherein an interface between the metal or metal alloy layer and an adjacent layer within the film has been subjected to an adhesion-enhancing treatment, or one or more adjacent layers comprises an adhesion-enhancing adjuvant, whereby the interlayer adhesion is increased.

27. A film according to claim 26 wherein the metal or metal alloy layer or an adjacent layer has been subjected to plasma treatment.

28. A film according to claim 22 wherein the film is stretched.

29. A film according to claim 22 wherein the metal or metal alloy layer has a crosslinked polymeric layer adjacent to each of its faces.

30. A film according to claim 22 further comprising one or more pairs of an additional crosslinked polymeric layer and an additional metal or metal alloy layer.

31. A film according to claim 22 wherein the metal or metal alloy layer comprises silver.

32. A film according to claim 22 wherein the crosslinked polymeric layer comprises an acrylate polymer.

33. A film according to claim 22 wherein the film can be laminated into an automotive windshield without substantial wrinkling.

34. A safety glazing pre-laminate comprising at least one layer of a mechanical energy-absorbing material joined to a visible light-transmissive and infrared-reflective film comprising a birefringent dielectric multilayer support that reflects at least 50% of light in a band at least 100 nm wide in a wavelength region of interest and which has atop the support in either order a crosslinked polymeric layer and a metal or metal alloy layer whose thickness is such that the film is at least about 20% visible light-transmissive and its reflection band is broadened with respect to tat of the support.

35. A glazing article comprising at least one layer of glazing material joined to a visible light-transmissive and infrared-reflective film comprising a birefringent dielectric multilayer support that reflects at least 50% of light in a band at least 100 nm wide in a wavelength region of interest id which has atop the support in either order a crosslinked polymeric layer and a metal or metal alloy layer whose thickness is such that the film is at least about 20% visible light-transmissive and its reflection band is broadened wit respect to that of the support.

36. An article according to claim 35 wherein the metal or metal alloy layer is between the support and the crosslinked polymeric layer.

37. An article according to claim 35 wherein the crosslinked polymeric layer is between the support and the metal or metal alloy layer.

38. An article according to claim 35 wherein an interface between die metal or metal alloy layer and an adjacent layer within the film has been subjected to an adhesion-enhancing treatment, or one or more adjacent layers comprises an adhesion-enhancing adjuvant, whereby the interlayer adhesion is increased.

39. An article according to claim 35 wherein the metal or metal alloy layer or an adjacent layer has been subjected to plasma treatment.

40. An article according to claim 35 wherein the metal or metal alloy layer comprises silver and the crosslinked polymeric layer comprises an acrylate polymer.

41. An article according to claim 35 wherein the glazing material comprises glass and the glazing article comprises an adhesive layer between the film and the glass.

42. An article according to claim 35 wherein the glazing material comprises non-planar glass and the laminate article is optically clear and infrared-reflective.

43. An article according to claim 35 wherein the article comprises a windshield.

44. An article according to claim 35 comprising architectural glazing.

45. A vehicle with glazing comprising at least one windshield, backlight, side window or skylight comprising a visible light-transmissive and infrared reflective film comprising a birefringent dielectric multilayer support that reflects at least 50% of light in a band at least 100 nm wide in a wavelength region of interest and which has atop the support in either order a crosslinked polymeric layer and a metal or metal alloy layer whose thickness is such that the film is at least about 20% visible light-transmissive and its reflection band is broadened with respect to that of the support.

46. A vehicle according to claim 45 wherein the crosslinked polymeric layer comprises silver and the crosslinked polymeric layer comprises an acrylate polymer.

* * * * *

UNITED STATES PATENT AND TRADEMARK OFFICE
CERTIFICATE OF CORRECTION

PATENT NO. : 7,215,473 B2
APPLICATION NO. : 10/222473
DATED : May 8, 2007
INVENTOR(S) : Robert J. Fleming It is certified that error appears in the above-identified patent and that said Letters Patent is hereby corrected as shown below:

Title Page,
Item (56), References Cited, OTHER PUBLICATIONS, Page 2, Col. 2, Line 15, delete "Internationl" and insert in place thereof -- International --.

Column 11,
Line 20, delete "norbonanediol;" and insert in place thererof
-- norbarnanediol; --.
Line 52, after "6,498,683," insert -- and --.

Column 14,
Line 5, delete "MOP" and insert in place thereof -- MOF --.

Column 24,
Line 12, delete "36.6 n/min," and insert in place thereof -- 36.6 m/min, --.

Column 27,
Line 37, delete "gazing" and insert in place thereof -- glazing --.
Line 44, delete "beating" and insert in place thereof -- heating --.

Column 28,
Line 44, delete "tat" and insert in place thereof -- that --.
Line 50, delete "id" and insert in place thereof -- and --.
Line 54, delete "wit" and insert in place thereof -- with --.
Line 63, delete "die" and insert in place thereof -- the --.

Signed and Sealed this

Twenty-ninth Day of April, 2008

JON W. DUDAS
*Director of the United States Patent and Trademark Office*